(12) United States Patent
Blackmon et al.

(10) Patent No.: US 10,982,738 B1
(45) Date of Patent: Apr. 20, 2021

(54) COUPLING SYSTEM FOR REDUCING FATIGUE AND DYNAMIC AMPLIFICATION OF LOADS IN OBJECTS

(71) Applicants: James B. Blackmon, Brownsboro, AL (US); Frederick Gant, Huntsville, AL (US)

(72) Inventors: James B. Blackmon, Brownsboro, AL (US); Frederick Gant, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 276 days.

(21) Appl. No.: 15/953,170

(22) Filed: Apr. 13, 2018

Related U.S. Application Data

(60) Provisional application No. 62/523,644, filed on Jun. 22, 2017.

(51) Int. Cl.
*F16H 7/12* (2006.01)
*F16H 7/08* (2006.01)
(Continued)

(52) U.S. Cl.
CPC .......... *F16H 7/1245* (2013.01); *F16F 15/08* (2013.01); *F16F 15/1232* (2013.01);
(Continued)

(58) Field of Classification Search
CPC ..... F16H 2007/0874; F16H 2007/0806; F16H 2007/0891; F16H 7/1281; F16H 7/1236
(Continued)

(56) References Cited

U.S. PATENT DOCUMENTS

| 1,582,516 A | * | 4/1926 | Gibson | F16H 7/1263 |
| | | | | 474/137 |
| 1,848,423 A | * | 3/1932 | Jackson | D01H 1/241 |
| | | | | 474/134 |

(Continued)

OTHER PUBLICATIONS

Musial, et al., "Improving Wind Turbine Gearbox Reliability," National Renewable Energy Laboratory, Conference Paper NREL/CP-500-41548, May 2007.
(Continued)

*Primary Examiner* — Henry Y Liu
(74) *Attorney, Agent, or Firm* — Maynard Cooper & Gale, P. C.; Jon E. Holland

(57) ABSTRACT

A coupling system can include an energy transfer device and a load mitigation system. The energy transfer device can include a shaft, gear, chain or piston-cylinder arrangement to transfer the energy from a power supply to an object to be moved. The load mitigation system can be used to limit or prevent the transfer of forces from the object to the drive unit as a result of external loads being applied to the object. The load mitigation system can be pre-loaded such that external loads on the object having an excessive impulsive or resonant cyclic force greater than the pre-load force on the load mitigation system are reduced and only partially transferred to the energy transfer device and power supply. The load mitigation system can dampen both resonant loads and impulsive impact loads occurring at the object thereby preventing damage and extending life.

17 Claims, 17 Drawing Sheets

(51) Int. Cl.
*F16F 15/123* (2006.01)
*F16F 15/08* (2006.01)

(52) U.S. Cl.
CPC ..... *F16H 7/0838* (2013.01); *F16H 2007/087* (2013.01); *F16H 2007/088* (2013.01); *F16H 2007/0874* (2013.01); *F16H 2007/0891* (2013.01)

(58) Field of Classification Search
USPC .................................................. 474/134–138
See application file for complete search history.

(56) References Cited

U.S. PATENT DOCUMENTS

| | | | | |
|---|---|---|---|---|
| 2,702,485 | A * | 2/1955 | Nadherny | F16H 7/14 474/138 |
| 2,954,726 | A * | 10/1960 | Kerridge | E01C 19/286 404/117 |
| 3,496,918 | A * | 2/1970 | Finlay | F01L 1/348 123/90.15 |
| 3,575,058 | A * | 4/1971 | Kraus | F16H 7/1281 474/29 |
| 3,630,096 | A * | 12/1971 | Brewer | F16H 7/1263 474/132 |
| RE27,861 | E * | 1/1974 | Kraus | F16H 9/16 474/29 |
| 3,913,410 | A * | 10/1975 | Ackerman | F16H 55/54 474/56 |
| 3,926,063 | A * | 12/1975 | Mayfield | F16H 7/1254 474/132 |
| 4,411,638 | A * | 10/1983 | Wilson | F16H 7/1236 474/138 |
| 4,634,408 | A * | 1/1987 | Foster | F16H 7/1236 474/135 |
| 4,696,664 | A * | 9/1987 | Wilson | F16H 7/1236 267/162 |
| 4,773,892 | A * | 9/1988 | Zarife | F16H 7/1236 474/138 |
| 4,934,989 | A * | 6/1990 | Furukawa | F16H 7/1281 474/135 |
| 4,952,198 | A * | 8/1990 | Cartaud | F16H 7/1236 474/138 |
| 5,000,724 | A * | 3/1991 | Reid | F16H 7/08 474/111 |
| 5,026,330 | A * | 6/1991 | Zermati | F16H 7/1236 474/110 |
| 5,181,887 | A * | 1/1993 | Pattano | F16H 7/1263 474/101 |
| 5,405,298 | A * | 4/1995 | Bristot | F16H 7/1236 474/136 |
| 6,093,123 | A * | 7/2000 | Baddaria | F01L 1/02 474/110 |
| 6,117,034 | A * | 9/2000 | Vine | F16H 7/1263 474/134 |
| 6,406,393 | B1 * | 6/2002 | Chen | F16H 7/1281 474/101 |
| 6,440,019 | B1 * | 8/2002 | Blackmon | F24S 30/40 474/101 |
| 6,689,001 | B2 * | 2/2004 | Oliver | F16H 7/1281 474/134 |
| 6,743,132 | B2 * | 6/2004 | Serkh | F16H 7/1218 474/109 |
| 6,821,223 | B2 * | 11/2004 | Henry | F01L 1/34 474/109 |
| 7,163,478 | B2 * | 1/2007 | Oliver | F16H 7/1281 474/133 |
| 7,419,447 | B2 * | 9/2008 | Serkh | F16H 7/1218 474/117 |
| 7,530,911 | B2 * | 5/2009 | Serkh | F16H 7/1218 474/133 |
| 9,151,366 | B2 * | 10/2015 | Antchak | F16H 7/1263 |
| 9,334,932 | B2 * | 5/2016 | Antchak | F16H 7/1281 |
| 9,447,850 | B2 * | 9/2016 | Farewell | F16H 7/1281 |
| 9,464,697 | B2 * | 10/2016 | Antchak | F16H 7/12 |
| 9,528,576 | B2 * | 12/2016 | Anstey | F16H 7/00 |
| 9,759,293 | B1 * | 9/2017 | Ryeland | F16H 7/1281 |
| 2003/0109342 | A1 * | 6/2003 | Oliver | F16H 7/1281 474/134 |
| 2005/0192142 | A1 * | 9/2005 | Stone | F01L 1/024 474/101 |
| 2006/0190093 | A1 * | 8/2006 | Buerger | B25J 13/025 623/26 |
| 2007/0227509 | A1 * | 10/2007 | Ueda | F01L 1/024 123/509 |
| 2009/0062046 | A1 * | 3/2009 | Lindemann | F16H 7/1263 474/101 |
| 2011/0077114 | A1 * | 3/2011 | Markley | F01L 1/024 474/111 |
| 2012/0174962 | A1 * | 7/2012 | Koningstein | G01S 3/7861 136/246 |
| 2013/0172137 | A1 * | 7/2013 | Antchak | F16H 7/12 474/133 |
| 2014/0187367 | A1 * | 7/2014 | Todd | F16H 7/0848 474/110 |
| 2018/0017143 | A1 * | 1/2018 | Antchak | B60K 6/485 |
| 2019/0024763 | A1 * | 1/2019 | Lebender | F16H 7/0848 |

OTHER PUBLICATIONS

Peterka, et al., "Wind Loads on Heliostats and Parabolic Dish Collectors," Solar Energy Research Institute, Final Subcontract Report SERI/STR-253-3431, Nov. 1988.

Nasa, "Terrestrial Environment (Climatic) Criteria Handbook for Use in Aerospace Vehicle Development," NASA-HDBK-1001, Aug. 2000.

* cited by examiner

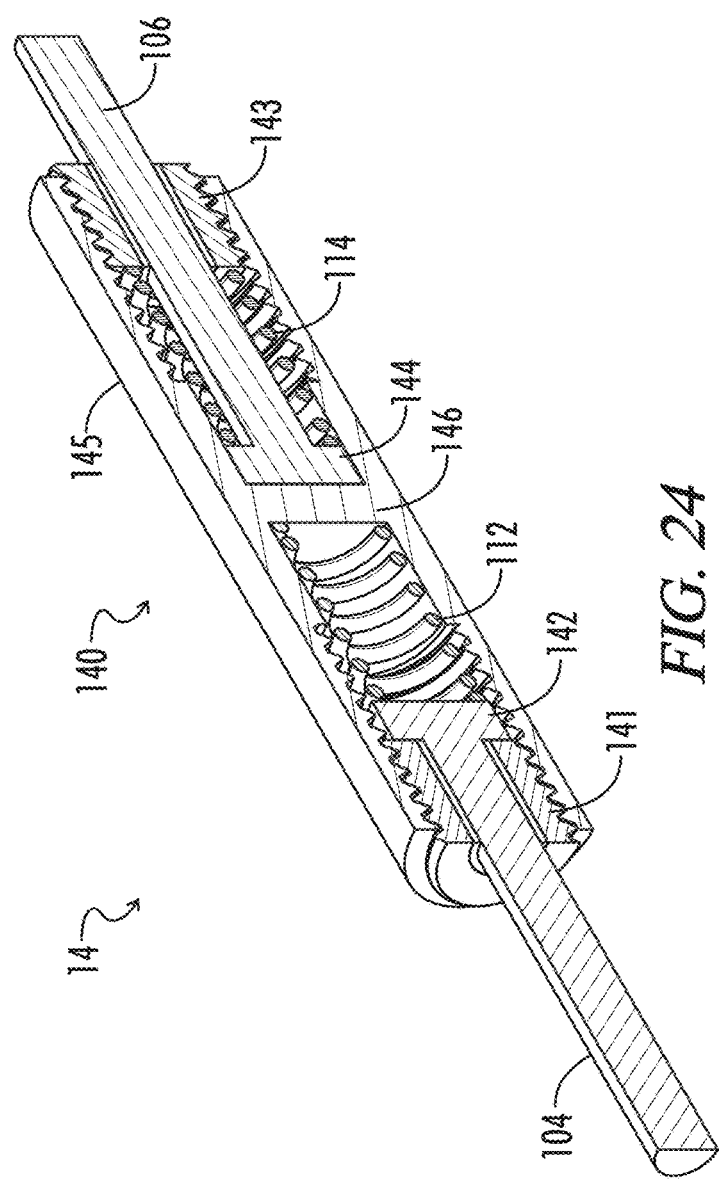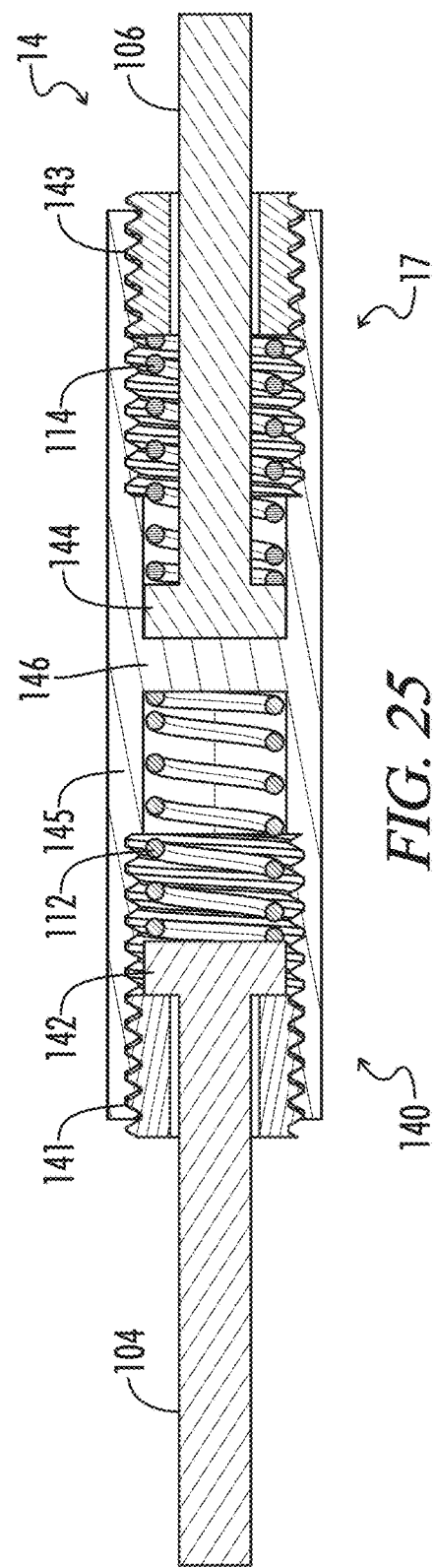
FIG. 24
FIG. 25

COUPLING SYSTEM FOR REDUCING FATIGUE AND DYNAMIC AMPLIFICATION OF LOADS IN OBJECTS

CROSS-REFERENCE TO RELATED APPLICATIONS

This application claims the benefit of U.S. Provisional Application No. 62/523,644, filed Jun. 22, 2017 and entitled "Coupling System for Reducing Fatigue and Dynamic Amplification of Loads in Objects," which application is hereby incorporated by reference in its entirety.

STATEMENT REGARDING FEDERALLY SPONSORED RESEARCH OR DEVELOPMENT

This invention was made with government support under Grant Number DE-FA0003593 awarded by the Department of Energy. The government has certain rights in the invention.

BACKGROUND

The present application generally relates to systems and methods for reducing fatigue and dynamic amplification of loads in objects.

Equipment, machinery, vehicles, drive units (e.g., power trains, gear boxes, transmissions, and/or actuators) and large structures (such as bridges or buildings) can experience both static and dynamic loads. The dynamic loads experienced by the objects can be significantly greater than the objects' normal static or quasi-static design load. The dynamic loads can be cyclic, transient, time-varying, or impulsive, i.e., resulting from impacts or collisions. High dynamic loads can occur due to winds, earthquakes, travel over rough terrain, severe cyclic use of equipment, machine tools, etc.

Both static and dynamic loads can contribute to a reduced object life. Cyclic loads, especially loads that are reversed, contribute to fatigue damage, resulting in limited object life unless relatively high (and costly) design and/or safety factors are used. Amplified dynamic loads that can be in excess of the static load typically used as the design requirement can occur as a result of a few cyclic loads coupling with the natural frequency of the object and any associated structure.

Any cyclic or reversible load that produces a stress above the endurance limit for a material (e.g., steel) contributes to the cumulative fatigue damage of the object using the material. Many materials, such as aluminum and various composites, have no endurance limit and can eventually fail when the number of applied loads is sufficiently high. If the cyclic load couples dynamically with the natural frequency of the object (also referred to as dynamic coupling), then the amplification of the load that occurs after just a few cycles can greatly increase the imposed stress on the object. With the higher stress, the number of cycles needed to produce cumulative fatigue damage in the object is reduced.

Although cumulative fatigue damage and dynamic coupling can occur with virtually any object, such as a drive unit, cumulative fatigue and dynamic coupling can be particularly applicable to solar collectors, such as heliostats or photovoltaic concentrators. The reason for fatigue damage and dynamic coupling being applicable to solar collectors is that the solar collectors are exposed to wind loads even when the solar collectors are in a safe-stow position and not in operation. The cyclic nature of wind loads due to gusts, down drafts, and vortex shedding can contribute to the fatigue damage of a solar collector over time, even if the wind loads are relatively low in frequency of occurrence, and even if the wind load itself is well below the peak design load.

There are three conventional approaches for dealing with loads in the design of drive units. First, adequate design/safety margins must be used. Second, drive shafts and actuators can be equipped with various devices that serve as shear pins. Third, the drive shafts can be coupled with various types of clutches, which are designed to slip when the torque exceeds some design limit. In addition, a jaw coupling can incorporate an elastomeric material that can deform azimuthally under an imposed torque, thereby absorbing some imposed load.

The approaches noted above have certain drawbacks for drive units, especially for solar collectors that may be exposed to over 10 million wind-induced, cyclic loads over the 20 to 30 year design life of the collector. For example, by increasing the design margin or safety factor of the drive unit, the drive unit becomes heavier and more costly, especially if the drive unit accounts for the dynamic coupling effect. In the event of a failure of the drive unit, the remove/replace operation can be expensive and time-consuming. Failure of the drive unit can also have additional consequences, such as hazards to other equipment or personnel. In another example, shear pins can be cheap and easy to replace when broken, but there is still a down-time and maintenance cost associated with replacing broken shear pins. In some cases, the free-wheeling shaft that can result from a broken shear pin can pose a hazard, such as allowing the unit to be exposed to worst case angles of attack, and even further excessive loads. The loss of control of the drive unit that can occur from a free-wheeling shaft also poses other problems, such as slippage or motor over-speed.

In a further example, the slip clutch approach is more costly to install, but allows for multiple shaft rotations under excessive loads, thus allowing the operator or control system to shut down the drive unit. Once slippage has stopped, the shaft can provide essentially the same load transmitting capability. However, with heliostats and other types of equipment, such as robotics, the rotation of the shaft and clutch means that whatever indexed position and orientation was initially provided for the drive unit has been lost. For the heliostat, this means that the heliostat must have its orientation re-initialized, such that subsequent operation of the heliostat can have the reflected beam on target. Thus, slip clutches have the drawback of essentially losing all initial position information provided for the drive unit, but they do maintain a higher degree of structural integrity than shear pins. There are other issues with slip clutches, such as a tendency to become bonded over time to the clutch plates and thus have high variations in static friction, i.e., "stiction". Once slippage has occurred, there can be other issues, including a change in the load for slippage, clutch failure, wear, etc. There is also a need for routine adjusting of the affixing bolts that determine the clutch pressure.

SUMMARY

The present application generally pertains to load mitigation systems and methods that reduce and mitigate the fatigue cycles and dynamic amplification of cyclic loads imposed on drive units or other types of objects. In addition, the load mitigation systems and methods can reduce or absorb high impulse loads such that major failures in the drive unit can be avoided. The use of the load mitigation systems and methods can result in a reduction in the number of fatigue cycles and the amplitude of severe (even worst case) peak loads that would normally be used to design the drive unit. As a result, the life of the drive unit can be increased and the total cost of the drive unit can be reduced because lower peak design loads are permitted due to the reduction in dynamic amplification and impulse loads provided by the load mitigation systems and methods. The load mitigation systems and methods can effectively increase the safety factor for the drive unit by essentially eliminating the "worst case" conditions. The load mitigation systems and methods can be used in applications such as solar power systems (e.g., heliostats and other solar collectors), transportation, heavy machinery (e.g., construction equipment, cranes, bull dozers, etc.), military equipment (e.g., tanks and off-road locomotion vehicles), agricultural equipment, machines (e.g., robotic arms and motor to gear box couplings), electronic equipment, automotive vehicles (e.g., drive shafts, axles, and mounts), aircraft (e.g., landing gears and control surface couplings), structures (e.g., buildings and bridges) or prosthetics.

The load mitigation systems and methods can be used to resolve the dynamic coupling issues for three basic types of load transmitting drive units and/or load bearing structures, which include: chain drives; linear actuators (or simple load bearing struts); and rotational drive units (e.g., conventional gears and advance drives such as harmonic drives, cycloid drives, etc.). The load mitigation systems and methods can provide the load transmitting drive units and/or load bearing structures with the integrated impulse-absorbing and dynamic damping capabilities needed to prevent damaging effects, such as very high coupled loads and increased fatigue, due to load transients and oscillations.

For certain designs, the fatigue damage can be reduced by pre-loading the load mitigation system such that the number of cyclic or impulsive loads that are actually imposed on the drive unit is reduced. The designs using pre-loading to reduce the number of cyclic or impulsive loads can be analogous to the classic bolted joint, for which the bolt pre-load is constant, even with imposed loads, until the imposed loads exceed the pre-load condition and the joint begins to separate. In one embodiment, the pre-load for the load mitigation system can be imposed with a detent release mechanism, such that the detent release mechanism provides a high stiffness up to some given pre-load magnitude, and beyond that, the mechanism releases, and a spring-damper system is then actuated to provide load mitigation. Dynamic coupling is then reduced by providing sufficient damping in the load mitigation system to minimize the load amplification. The load mitigation system can provide a "tunable" damping ratio sufficient to ensure that even resonant loads applied at the natural frequency of the drive unit are reduced. Tunable damping in the load mitigation system can be achieved by using one or both of the following: elastomeric damping with laminated elastomeric materials bonded to metallic springs or fluid flow through one or more orifices. In one embodiment, the use of damping coefficient ratios, $n/n_c=1/(2*SF)$, can eliminate amplification loads, even at resonance frequencies, greater than the design load multiplied by the safety factor (SF).

A major advantage of the present application is that the load mitigation system reduces the fatigue cycles, high impulse loads and dynamic amplification of loads imposed on drive units, but in addition, the load mitigation system can provide high stiffness, which can be important for some applications such as solar tracking concentrators and robotic devices.

Another advantage of the present application is that the load mitigation system can be integrated or incorporated directly into the drive unit and function as part of the drive unit.

An additional advantage of the present application is that load mitigation system permits the drive unit and support structure to be designed for lower stress levels that are more commonly associated with normal conditions, thus reducing the size, weight and/or cost of the drive unit.

A further advantage of the present application is that load mitigation system can mitigate relatively infrequent extreme load conditions on the drive unit.

Still another advantage of the present application is that the load mitigation system can absorb very high loads applied over a substantial distance or causing a high degree of deformation through friction, in both directions, in the drive unit.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

FIGS. 24 and 25 show side and perspective cross-sectional views of a coupling system with an embodiment of a load mitigation system.

Wherever possible, the same reference numbers are used throughout the drawings to refer to the same or like parts.

DETAILED DESCRIPTION

Figure 1:
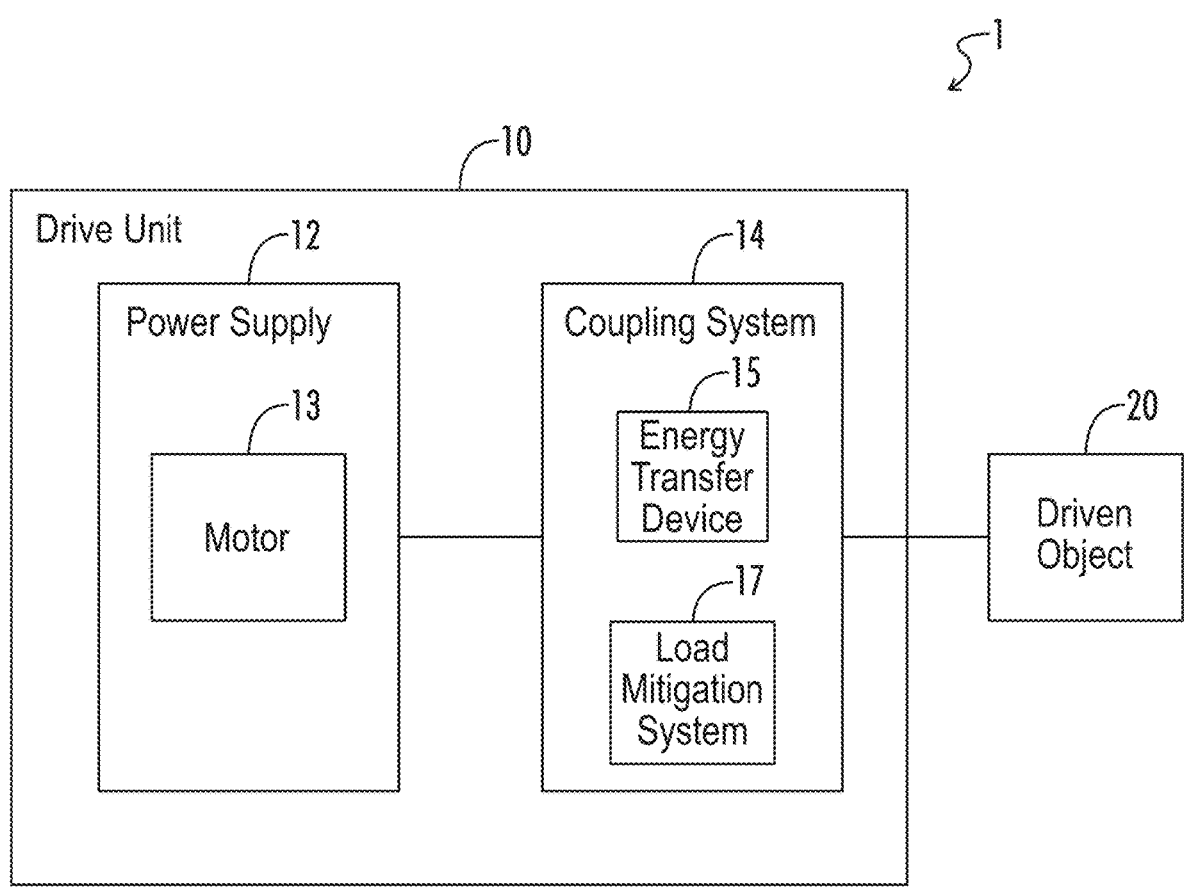
FIG. 1 is a block diagram of an embodiment of a mechanical system with a drive unit.

The present disclosure is directed to various configurations of load mitigation systems that reduce the high impulse loads, fatigue cycles and dynamic amplification of loads imposed on drive units, such as power trains, gear boxes, transmissions, actuators, or other structures or objects. Regardless of the configuration, the load mitigation systems of the present disclosure can have one or more of the follow characteristics: high stiffness; reversible load reduction with damping; high damping coefficient once deformation occurs; or maximum load protection.

The load mitigation system can provide high stiffness below a predetermined stress or force magnitude. By having a high stiffness factor, the load mitigation system can transmit forces with very little deflection and thereby maintain a high positional or orientation accuracy. When forces are above the predetermined stress or load limit, but below a maximum load condition (e.g., a near instantaneous impact, collision or sudden acceleration), the load mitigation system can provide a reversible deformation that provides both damping and reduction in impact load by extending the impulse load applied over time (and distance) such that the transmitted force is far less than the incident force if applied as an impulse. Various examples are provided in the designs discussed further below. For example, a spring-damping mechanism used with a staged chain drive can have lockable detents, secured by springs, such that below a preset load value, there is no spring deflection and thus no movement of a corresponding chain drive sprocket. Above the preset load value, the detents release and the spring-damping effect occurs, mitigating the load imposed on the staged chain drive. The use of the detents in the design can provide high stiffness under normal conditions, but the detent release mechanism allows the spring-damping mechanism to mitigate high loads and reduce fatigue damage.

The load mitigation system can also have a high damping coefficient once deformation occurs as a result of forces greater than the predetermined stress or load limit. The damping coefficient (or damping ratio) for the load mitigation system can be selected to reduce dynamic amplifications such that there is little, or no amplification of the load, even near the resonant natural frequency of the drive unit. If the load condition on the drive unit exceeds the maximum load condition, the load mitigation system can reversibly move a greater distance such that a series of resonant loads (e.g., tension and compression or clockwise and counter-clockwise movements) are absorbed and dampened.

The load mitigation system can be "pre-loaded" to reduce the number of external cyclic or impulsive loads that are imposed on the drive unit or other object and thereby reduce fatigue damage to the drive unit or object. External loads encountered by the load mitigation system (and drive unit) that are less than the pre-load condition in the load mitigation system do not apply as great of a fatigue load to the drive unit since the external load is not cyclically reversed as tension and compression. In other words, the load mitigation system (and drive unit) do not experience as many external cyclic loads less than the pre-load condition of the load mitigation system since the external load cannot overcome the existing load at the load mitigation system (and drive unit) applied by the pre-load condition of the load mitigation system. The effect of the pre-load condition can be analogous to the classical bolted joint, in which the bolt experiences essentially no fatigue loads for loads less than the pre-load applied to the bolt.

The load mitigation system can provide sufficient damping to minimize load amplification and reduce dynamic coupling. The damping coefficient ratio for the load mitigation system can be selected to ensure that resonant loads applied at the natural frequency of the drive unit or other object are reduced, and in the case of critical damping (e.g., damping coefficient of 0.707), are no greater than the static load. In one embodiment, a damping coefficient ratio of $n/n_c=1/(2*SF)$, for a given safety factor (SF), can prevent the maximum dynamic load from exceeding the design load multiplied by the selected safety factor. The load mitigation system can also absorb a high load applied over a substantial distance or causing a high degree of deformation through the use of frictional forces in both the initial direction of the load and the return of the load mitigation system to its initial position.

FIG. 1 is a block diagram of a mechanical system 1. The system 1 can include a drive unit 10 coupled to a driven object 20. In one embodiment, the drive unit 10 can be a power train, gear box, transmission, chain drive, rotational drive, strut, linear actuator or other type of actuator. In other embodiments, the drive unit 10 can include other systems and mechanisms. The drive unit 10 can be used to move (e.g., linearly translate or rotate) the driven object 20. In one embodiment, the driven object 20 can be a solar collector (e.g., a heliostat or photovoltaic concentrator), robotic arm, or wheel. However, in other embodiments, the driven object 20 can include other systems or mechanisms to be moved by a drive unit 10.

The drive unit 10 can include a power supply 12 and a coupling system 14. The coupling system 14 can be used to transfer the energy generated by power supply 12 to the driven object 20 to move the driven object 20. In the embodiment shown in FIG. 1, the power supply 12 can include a motor 13, such as an electric motor or combustion engine. However, in other embodiments, the power supply 12 can include air pumps, hydraulic pumps or other systems or mechanisms that can apply energy to the coupling system 14.

The coupling system 14 can include an energy transfer device 15 and a load mitigation system 17. The energy transfer device 15 can be used to couple the power supply 12 and the driven object 20 and transfer the energy from the power supply 12 to the driven object 20. In one embodiment, the energy transfer device 15 can be a shaft, chain or piston-cylinder arrangement, but it is to be understood that other devices can be used in other embodiments. The load mitigation system 17 can be used to limit or prevent the transfer of excessive forces from the driven object 20 to the drive unit 10 as a result of external loads being applied to the driven object 20. The load mitigation system 17 can be either used in conjunction with the energy transfer device 15 or incorporated directly within the energy transfer device 15. Regardless of the configuration of the load mitigation system 17, the load mitigation system 17 can damp both resonant loads and impact loads occurring at the driven object.

Figure 2:
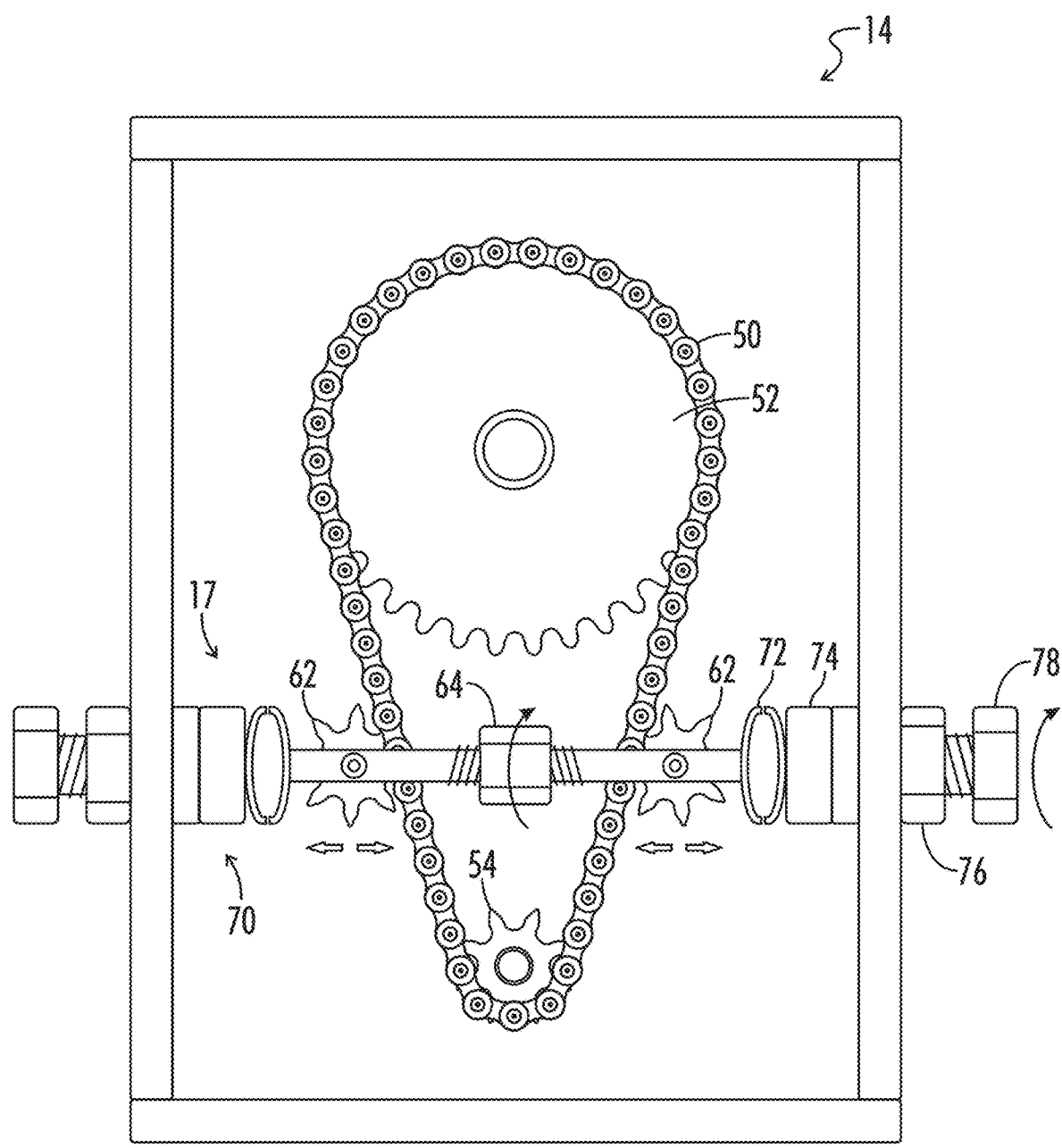
FIGS. 2-4 are schematic diagrams of coupling systems for chain drives with different embodiments of load mitigation systems.

FIGS. 2-6 show different embodiments of components of load mitigation systems 17 incorporated into the coupling systems 14 of drive units 10 configured as chain drives. As shown in FIG. 2, the coupling system 14 includes a chain 50 coupling a driving sprocket 52 and a driven sprocket 54. The chain 50 (i.e., the energy transfer device 15 of the coupling system 14) is used to transfer energy from the driving sprocket 52, which can be connected to and rotated by a motor 13 (not shown in FIG. 2), to the driven sprocket 54, which can be connected to the driven object 20 (not shown in FIG. 2). The chain 50 can engage with teeth of the driving sprocket 52 and the driven sprocket 54 such that when the driving sprocket 52 is rotated, the driven sprocket 54 can be rotated by the force applied to the driven sprocket 54 by chain 50. In another embodiment, the driven sprocket 54 can be configured as the "driving sprocket" and the driving sprocket 52 can be the "driven sprocket."

A load mitigation system 17 can be coupled to the chain 50 to "pre-load" the chain 50 and absorb external sources of energy applied to the chain 50. In one embodiment, the load mitigation system 17 can have spring-loaded detents that prevent the main spring-damper in the load mitigation system 17 from deflecting for loads below a preset value. Preloading the chain 50 with a force above that primarily used with conventional chain drives to avoid chain slippage off the sprockets 52, 54 reduces cumulative fatigue damage on the sprockets 52, 54 and chain 50. The load mitigation system 17 can apply a pre-load on both sides of the chain 50 such that the tension in the chain 50 is usually higher than the tension required to offset some induced external force on the chain 50.

As shown in the embodiment of FIG. 2, the load mitigation system 17 can have a substantially horizontal orientation. In other words, the load mitigation system 17 can be arranged linearly with respect to the chain 50. The load mitigation system 17 has a pair of idler sprockets 62 coupled together by a turnbuckle 64. The turnbuckle 64 can be used to adjust the tension applied to the chain 50 by the idler sprockets 62, thereby pre-loading the chain 50. The pre-loading of the chain 50 by the turnbuckle 64 can be based on the lateral force applied by the turnbuckle 64 and idler sprockets 62 and the angle of chain 50. In one embodiment, the turnbuckle 64 can be used to either pull the idler sprockets 62 together to tighten the chain 50 or separate the idler sprockets 62 to loosen the chain 50.

The load mitigation system 17 can also include a damping mechanism 70 coupled to each of the idler sprockets 62. Each damping mechanism 70 can include one or more spring mechanisms 72 and one or more damper elements 74. The damping mechanism 70 can also include a locking nut 76 to hold the damping mechanism 70 in the load mitigation system 17 and a tensioning nut 78 to adjust the compression of the spring mechanism 72 and the damper element 74 to further adjust the pre-loading of the chain 50. In one embodiment, the spring mechanism 72 can be a disc spring (or Belleville washer), spring washer, coil spring or other suitable type of spring. In another embodiment, the damper element 74 can be a viscoelastic material such as Sorbothane, an elastomeric material, a rubber material or a polymer material. In an embodiment, the damper element 74 can have a thickness that can vary between 0.25 inches or less to 1 inch or more depending on the amount of damping required from the damper element 74. In the preceding embodiment, the dimensions relating to the thickness of the damper element 74 can be for illustration and clarification and based on a design that was built and tested for a 9.8 square meter heliostat and the corresponding load conditions, etc., of the heliostat. In other embodiments, other thicknesses of the damper element 74 can be used with heliostats having different sizes. The damper element 74 in the embodiment of FIG. 2 shows a single piece of damping material, but the damper element 74 can include more than one piece of damping material in other embodiments. The damping mechanism 70 can absorb external loads, such as cyclic loads or impact loads, on the chain 50, through the compression and expansion of both the spring mechanism 72 and/or the damper element 74 depending on the magnitude of the load.

Figure 3:
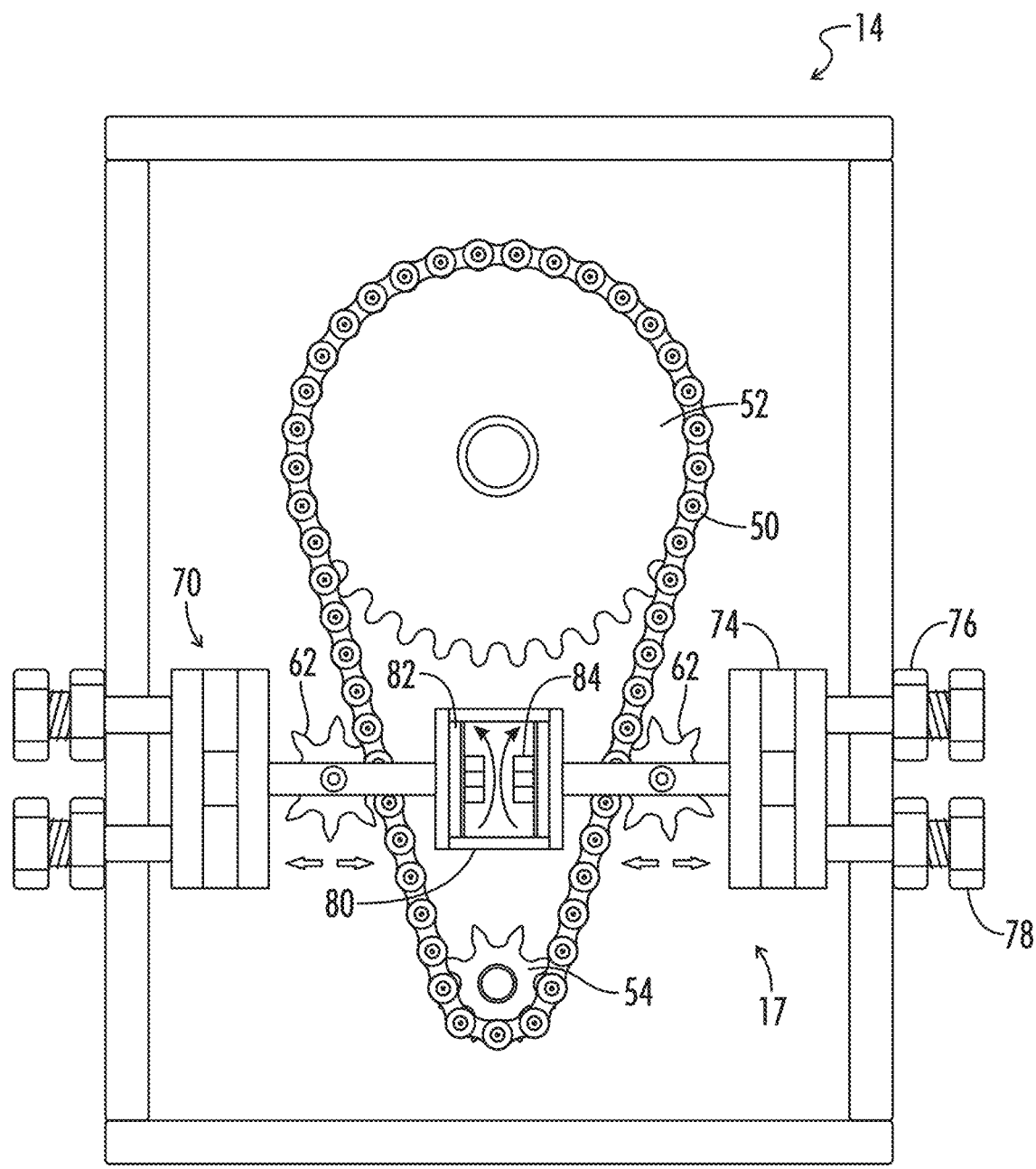

In the embodiment of the load mitigation system 17 shown in FIG. 3, the load mitigation system 17 can maintain the horizontal or linear orientation as shown in FIG. 2, but incorporate different components. The load mitigation system 17 of FIG. 3 replaces the turnbuckle 64 with a damping mechanism 80 that is coupled to the idler sprockets 62 and used to tension (and pre-load) the chain 50. The damping mechanism 80 can include a damper element 82 for each of the idler sprockets 62. The damper elements 82 can be used to permit a slight change in separation distance between the opposed sides of the chain 50 when under load. The damping mechanism 80 can also include tensioning nuts 84 to individually adjust the tension applied to the chain 50 by the corresponding idler sprocket 62.

The load mitigation system 17 of FIG. 3 can also include a damping mechanism 70, a locking nut 76 and a tensioning nut 78 similar to the embodiment of the load mitigation system 17 of FIG. 2. However, the damping mechanism 70 of FIG. 3 does not include a spring mechanism 72, but does have a damper element 74. In the embodiment shown in FIG. 3, the damper element 74 can include two or more pieces of damper material to form the damper element 74. However, in other embodiments, a single piece of damper material can be used. Similarly, the damper element 82 can use more than one piece of damping material.

Figure 4:
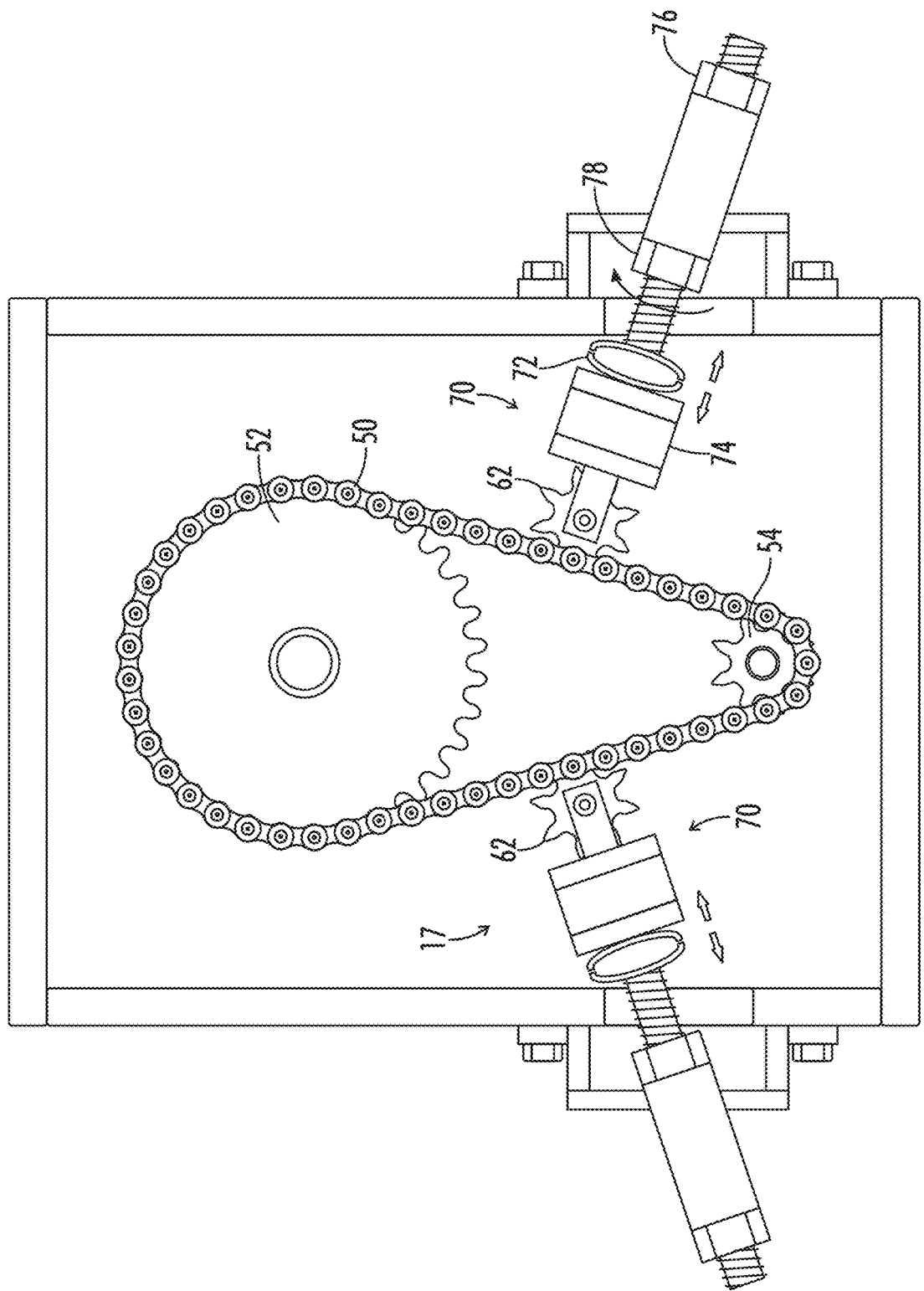

In the embodiment of the load mitigation system 17 shown in FIG. 4, the load mitigation system 17 can include two independent damping mechanisms 70, one for each idler sprocket 62 on each side of the chain 50. In the embodiment of FIG. 4, the damping mechanisms 70 can be used to tension (and pre-load) the chain 50 by applying a force on the chain 50 with the corresponding idler sprocket 62. The tension applied to the chain 50 by the corresponding idler sprocket 62 can be controlled using the locking nut 76 and tensioning nut 78. The damping mechanism 70 in the embodiment of FIG. 4, can include a damper element 74 next to the idler sprocket 62 followed by the spring mechanism 72. The damping mechanisms 70 and idler sprockets 62 can be positioned at an angle relative one another such that each idler sprocket 62 is substantially perpendicular to the chain 50. The substantially perpendicular positioning of the idler sprockets 62 and damping mechanisms 70 permits the corresponding damper elements 74 (and spring mechanisms 72) to compress and expand to absorb energy from high impact loads on the chain 50.

Figure 5:
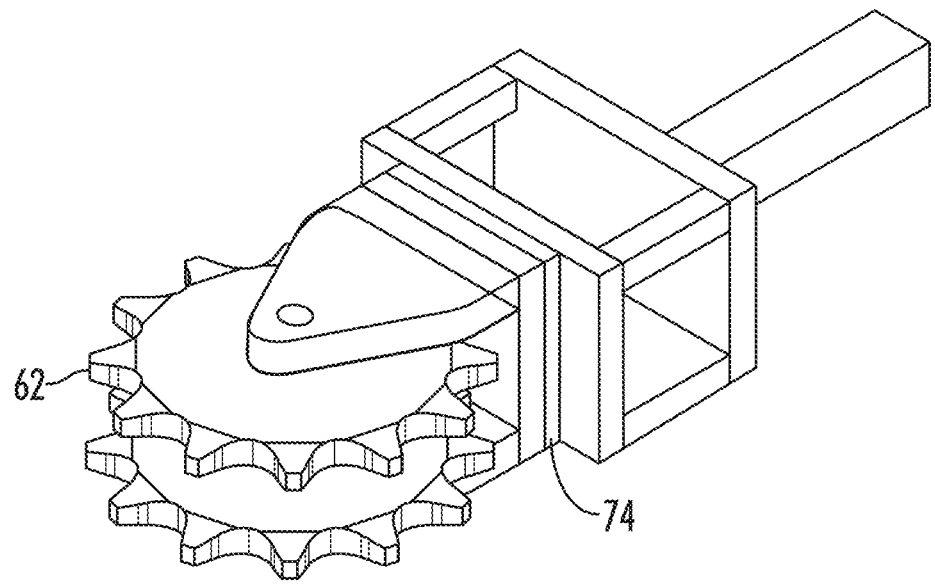
FIGS. 5 and 6 show embodiments of idler sprockets used with the coupling systems of FIGS. 2-4.
Figure 6:
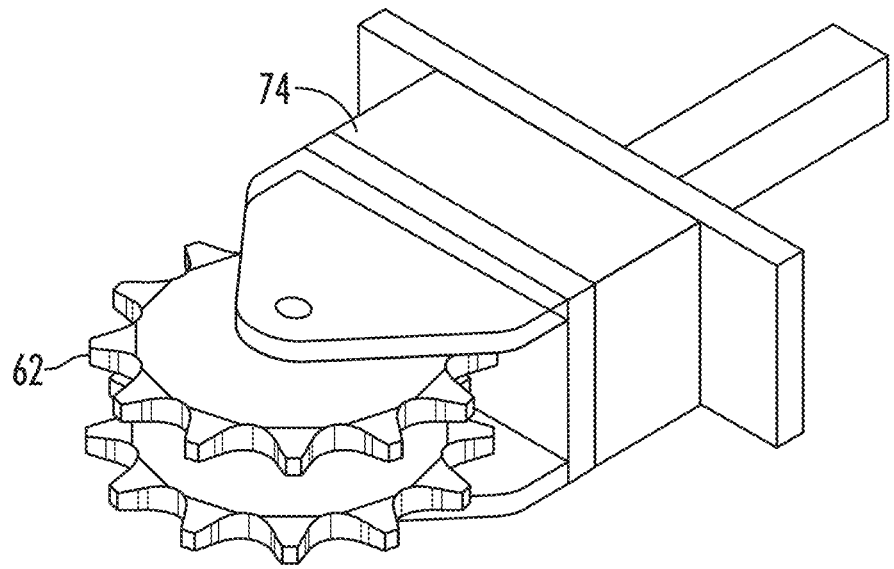

In some embodiments, the coupling system 14 can include a dual-chain configuration that is essentially stacked together on the same shaft and can include two chains 50, two driving sprockets 52 and two driven sprockets 54. In other embodiments, more than two chain configurations can be used. The two (or more) driving sprockets 52 can be mounted side-by-side (or in parallel) on the same shaft. Similarly, the two (or more) driven sprockets 54 can be mounted side-by-side (or in parallel) on the same shaft. A chain 50 can be used to couple each corresponding set of driving sprocket 52 and driven sprocket 54. FIGS. 5 and 6 show different embodiments of the idler sprocket 62 and damper element 74 that can be used with a dual-chain configuration of the coupling system 14. In the embodiment shown in FIG. 5, the damper element 74 can have a smaller thickness, while in the embodiment shown in FIG. 6, the damper element 74 can have a larger thickness. In one embodiment, the thickness of the damper element 74 in FIG. 6 can be about 1 inch and the area can be about 4 square inches, but thicknesses greater than or less than 1 inch and/or areas greater than or less than 4 square inches can also be used. In another embodiment, the damper element 74 in FIG. 6 can have a modulus on the order of 10 to 20 psi. The damper element 74 in the embodiment of FIGS. 5 and 6 shows a single piece of damping material, but the damper element 74 can include more than one piece of damping material in other embodiments.

The damping mechanisms 70 shown in FIGS. 2-4 have some, albeit reduced, deflection when torque is applied to the sprocket 52 and chain 50. The deflection may exceed the angular or linear movement permitted for the drive unit 10. To achieve a much higher stiffness for such loads, a locking detent mechanism can be used to prevent this type of movement up to a given pre-load value. There may be some extension of the detent mechanism due to the tensile properties of the material, but the amount of extension can be generally low and determined by design.

Figure 23:
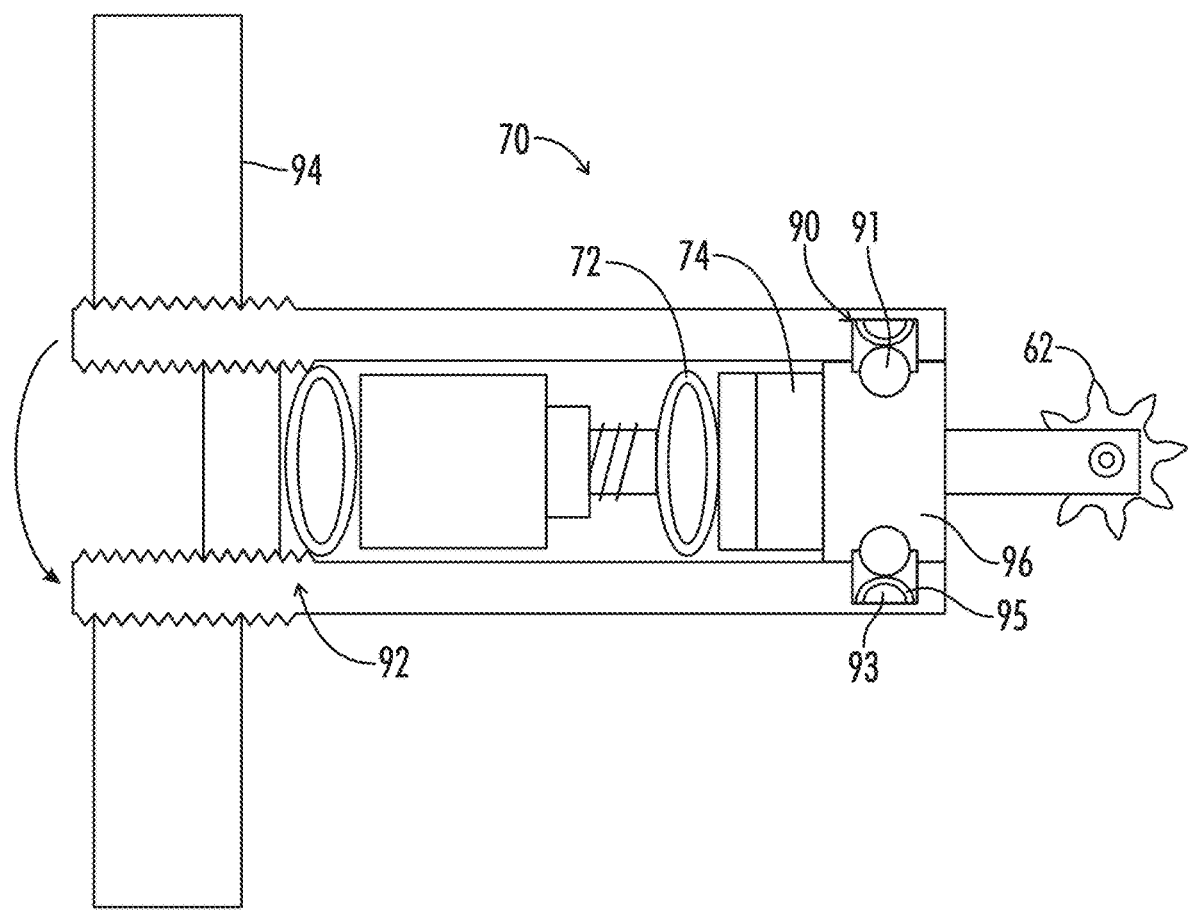
FIG. 23 shows a schematic diagram of an embodiment of a load mitigation system used with the coupling systems of FIGS. 2-4.

In one embodiment, as shown in FIG. 23, a locking detent mechanism 90 can be used to provide stiffness and have the ability to mitigate the load on the coupling system 14 to minimize fatigue or dynamic load damage. The locking detent mechanism 90 can be incorporated with the damping mechanism 70 that is held inside an adjustable cylinder 92 that is supported by the housing structure 94. Below the pre-load force level, the movement of the sprocket 52 and chain 50 under the torque load is very low, corresponding to the stiffness associated with the locking detent mechanism 90 and cylinder 92 and results in no load being applied to the damping mechanism 17. The load path for low torque loads is through the detents 91 of the locking detent mechanism 90 and cylinder 92, with essentially no deflection until the detents 91 release (i.e., the detents 91 are pushed into a recess 93 of cylinder 92 by member 96). In one embodiment, a corresponding spring mechanism 95 can be positioned into each recess 93 to apply the pre-load force to the detents 91. Once the torque produces a load on the chain 50 that has a component that exceeds the pre-load and detent load capacity, then the spring-loaded detent 91 releases. The release of the detents 91 allows the damping mechanism 70, now seated against the drive unit housing 94, to provide the relatively high degree of deflection, coupled with the damping of the damper element 74, needed to mitigate the high impulse and/or dynamically coupled load. Once the high torque load is relieved, such as with a wind gust or vortex shedding, etc., then the locking detent mechanism 90 returns the detents 91 to an initial position under the spring action of spring mechanisms 95, again providing high stiffness through the cylinder 92, detents 91, and drive unit housing 94. In other embodiments, the locking detent mechanisms 90 shown in FIG. 23 can be used with the damping mechanisms 70 shown in FIGS. 2-4.

Figure 7:
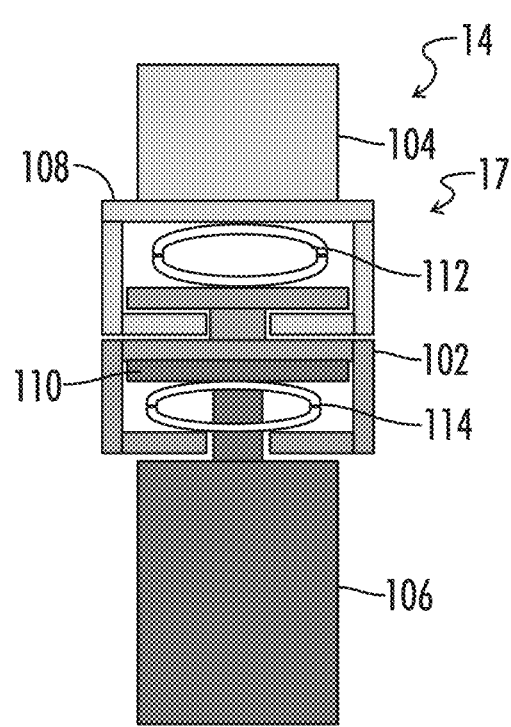
FIG. 7 shows a schematic diagram of a coupling system for a linear actuator with an embodiment of a load mitigation system.
Figure 8:
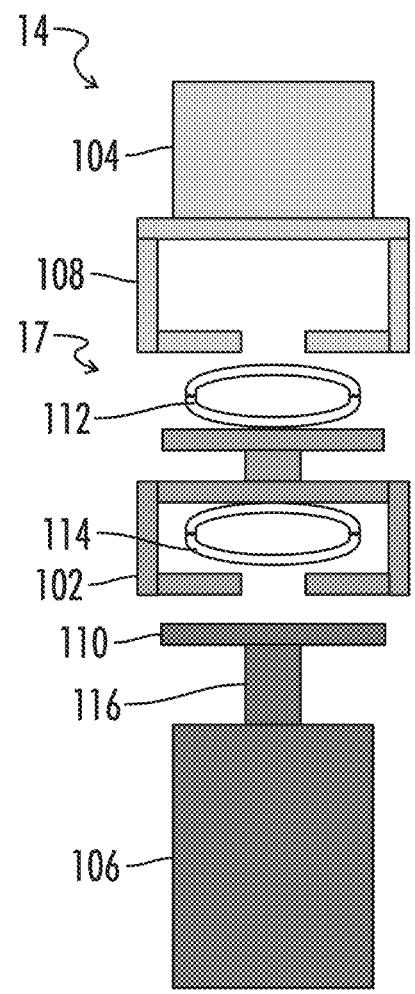
FIG. 8 shows a partially exploded view of the coupling system of FIG. 7.

FIGS. 7-15 show different embodiments of components of load mitigation systems 17 incorporated into the coupling systems 14 of drive units 10 configured as linear actuators. As shown in FIGS. 7 and 8, the coupling system 14 includes a coupler 102 coupling a driving shaft 104 and a driven shaft 106. The coupler 102 (i.e., the energy transfer device 15 of the coupling system 14) is used to transfer energy from the driving shaft 104, which can be connected to and moved by a motor 13 (not shown in FIGS. 7 and 8), to the driven shaft 106, which can be connected to the driven object 20 (not shown in FIGS. 7 and 8). The coupler 102 can engage with a connecting portion 108 of the driving shaft 104 and a connecting portion 110 of the driven shaft 106 such that when the driving shaft 104 is extended or retracted along a center axis, the driven shaft 106 can likewise be extended and retracted along the same axis (or a parallel axis) by the force applied to the connecting portion 110 of the driven shaft 106 by coupler 102.

A load mitigation system 17 can be used with the coupler 102 to "pre-load" the coupler 102 and absorb external sources of energy applied to the coupler 102. The pre-load on the coupler 102 enables the coupler 102 to prevent deflection of the driving shaft 104 relative to the driven shaft 106 and to maintain a substantially constant distance between the driving shaft 104 and the driven shaft 106 when external forces applied to the driven shaft 106 are less than the pre-load conditions.

As shown in the embodiment of FIGS. 7 and 8, the load mitigation system 17 can be oriented or positioned to be in-line or substantially co-axial with the driving shaft 104 and the driven shaft 106. The load mitigation system 17 has a first spring mechanism 112 positioned between coupler 102 and connecting portion 108 and a second spring mechanism 114 positioned between coupler 102 and connecting portion 110. The pre-load for the coupler 102 provided by the load mitigation system 17 can be based on the spring tension of the first spring mechanism 112 and the second spring mechanism 114. In one embodiment, one or both of the first spring mechanism 112 and the second spring mechanism 114 can be laminated with an elastomeric material, which can alter the corresponding pre-load force provided by the first spring mechanism 112 and the second spring mechanism 114. In another embodiment, the first and second spring mechanisms 112 and 114 can each be a disc spring (or Belleville washer), spring washer, coil spring or other suitable type of spring.

In one embodiment, there can be a slight displacement between the two shafts 104 and 106 where they are coupled together at 108 and 110 due to a compressive force applied at the top of the shaft 104 such that the first spring mechanism 112 compresses slightly more than its initial compression because the compressive load exceeds the initial pre-load of the first spring mechanism 112. Thus, excessive load can be mitigated by the movement of the first spring mechanism 112 and dynamic coupling is prevented by providing sufficient damping by the laminated elastomeric material on the first spring mechanism 112 and the second spring mechanism 114 such that cyclic resonance does not occur. In another embodiment, when an excessive load in tension is applied at the shaft 106, such that the top of the shaft 110 compresses the second spring mechanism 114. The compression of the second spring mechanism 114 can be used to mitigate the excessive load and prevent dynamic coupling by providing sufficient damping by the laminated elastomeric material on the second spring mechanism 114.

Figure 9:
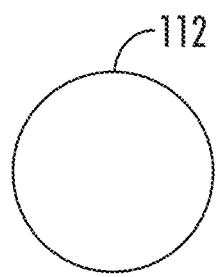
FIGS. 9 and 10 show top views of spring mechanisms from the load mitigation system of FIGS. 7 and 8.
Figure 10:
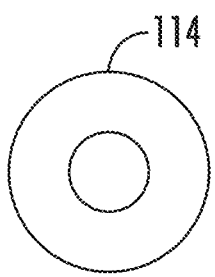

FIG. 9 shows a top view of an embodiment of the first spring mechanism 112 and FIG. 10 shows a top view of an embodiment of the second spring mechanism 114. The second spring mechanism 112 has a center hole to enable the second spring mechanism 114 to be placed about a shaft portion 116 (see FIG. 8) of the connecting portion 110. The first spring mechanism 112 can be used to absorb external compression loads, such as can be found in cyclic loads or impact loads, on the coupler 102, through the compression of the first spring mechanism 112. When the first spring mechanism 112 is being compressed in response to a compression load greater than the pre-load force, the second spring mechanism 114 can be expanded to assist with the absorbing of the compression load. The second spring mechanism 114 can be used to absorb external tensile loads greater than the pre-load force, such as can be found in cyclic loads or impact loads, on the coupler 102, through the compression of the second spring mechanism 114. When the second spring mechanism 114 is being compressed in response to a tensile load, the first spring mechanism 112 can be expanded to assist with the absorbing of the tensile load. If the external load on the coupler 102 is a cyclic load, the use of the laminated elastomeric material on the first and second spring mechanisms 112 and 114 can provide additional damping capabilities and can minimize or eliminate dynamic coupling.

Figure 11:
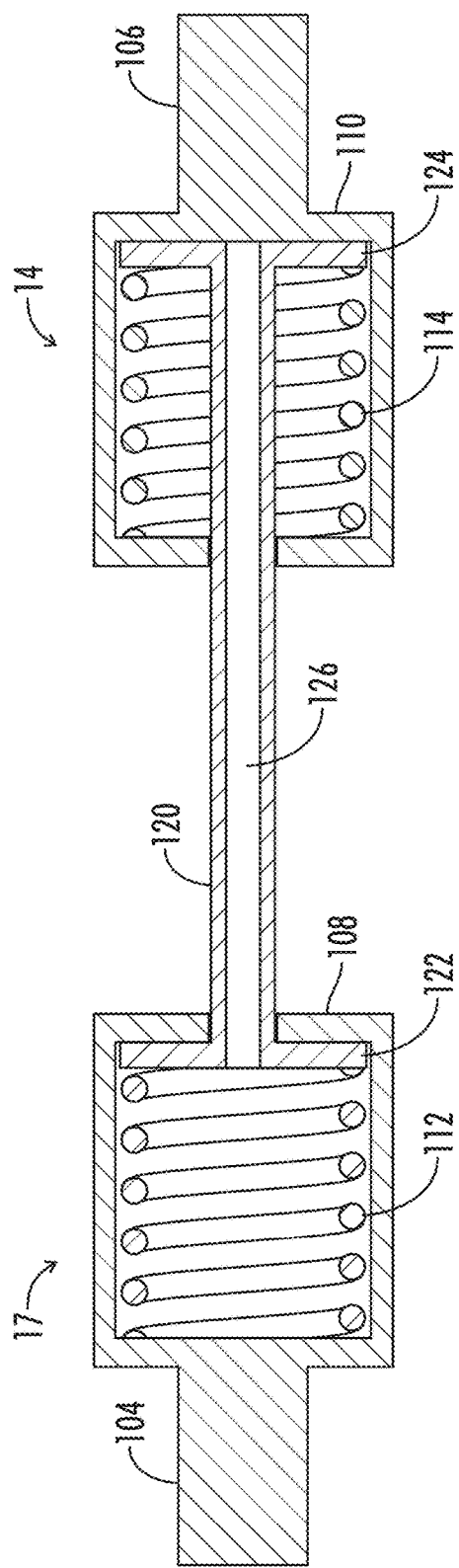
FIGS. 11 and 12 show side and perspective views of a coupling system with an embodiment of a load mitigation system.
Figure 12:
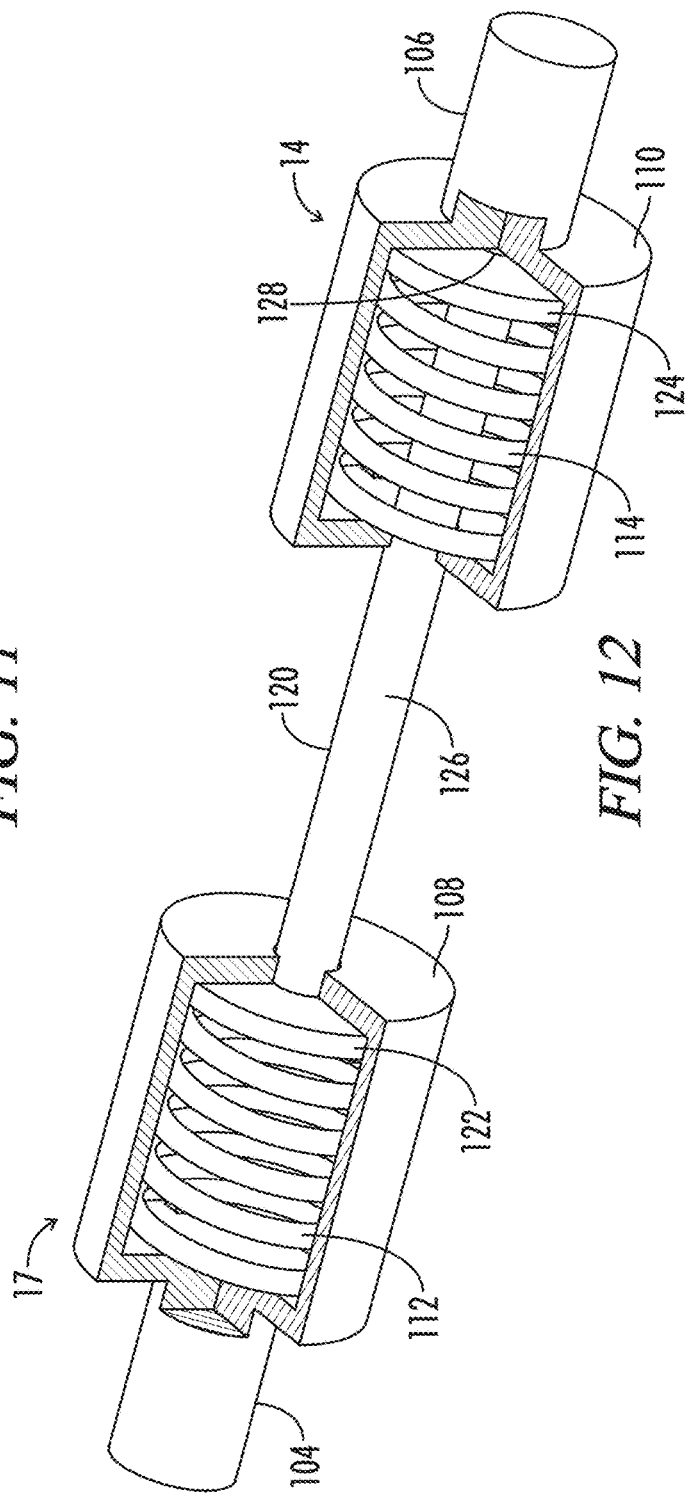

As shown in FIGS. 11 and 12, the coupling system 14 can include a coupler 120 coupling the driving shaft 104 and the driven shaft 106. The coupler 120 (i.e., the energy transfer device 15 of the coupling system 14) is used to transfer energy from the driving shaft 104, which can be connected to and moved by a motor 13 (not shown in FIGS. 11 and 12), to the driven shaft 106, which can be connected to the driven object 20 (not shown in FIGS. 11 and 12). The coupler 120 can have a first end plate 122 located in a connecting portion 108 of the driving shaft 104 and a second end plate 124 located in a connecting portion 110 of the driven shaft 106 such that when the driving shaft 104 is extended or retracted along a center axis, the driven shaft 106 can likewise be extended and retracted along the same axis (or a parallel axis) by the force applied to the connecting portion 110 of the driven shaft 106 by the end plate 124 of coupler 120.

The coupler 120 can have a shaft portion 126 connecting the first end plate 122 and the second end plate 124. The connecting portion 108 can have a hollow cylindrical shape such that the first end plate 122 is able to move axially (like a piston) in the connecting portion 108. Similarly, the connecting portion 110 can have a hollow cylindrical shape such that the second end plate 124 is able to move axially (like a piston) in the connecting portion 110. A load mitigation system 17 can be used with the coupler 120 to "pre-load" the coupler 120 and absorb external sources of energy applied to the coupler 120. The pre-load on the coupler 120 enables the coupler 120 to prevent deflection of the driving shaft 104 relative to the driven shaft 106 when external forces applied to the driven shaft 106 are less than the pre-load conditions.

As shown in the embodiment of FIGS. 11 and 12, the load mitigation system 17 can be oriented or positioned to be in-line or substantially co-axial with the driving shaft 104 and the driven shaft 106. The load mitigation system 17 has a first spring mechanism 112 positioned in the connecting portion 108 to contact the first end plate 122 opposite the shaft portion 126 and a second spring mechanism 114 positioned in the connecting portion 110 to contact the second end plate 124 next to the shaft portion 126. The pre-load for the coupler 120 provided by the load mitigation system 17 can be based on the spring tension of the first spring mechanism 112 and the second spring mechanism 114. In one embodiment, the first and second spring mechanisms 112 and 114 can each be a disc spring (or Belleville washer), spring washer, coil spring or other suitable type of spring. In another embodiment, one or both of the first spring mechanism 112 and the second spring mechanism 114 can be laminated with an elastomeric material, which can alter the corresponding pre-load force provided by the first spring mechanism 112 and the second spring mechanism 114.

In an embodiment, the first end plate 122, the second plate 124 and the shaft portion 126 of the coupler 120 can have one or more passageways 128 along a longitudinal axis to permit a fluid to flow between the connecting portion 108 and the connecting portion 110, which movement of fluid between the connecting portions 108 and 110 can alter the corresponding pre-load force provided by the first spring mechanism 112 and the second spring mechanism 114. In one embodiment, the fluid can be a hydraulic fluid and the shaft 126 can be sealed along the cylindrical shaft. In another embodiment, the one or more passageways 128 can include relatively large orifices with a serpentine flow to avoid clogging. In still another embodiment, the first end plate 122 and/or the second end plate 124 can include a Lee Visco-Jet disk.

The first spring mechanism 112 can be used to absorb external compression loads that exceed the spring pre-load, such as can be found in cyclic loads or impact loads, on the coupler 120, through the compression of the first spring mechanism 112. The second spring mechanism 114 can be used to absorb external tensile loads, such as can be found in cyclic loads or impact loads, on the coupler 120, through the compression of the second spring mechanism 114. If the external load on the coupler 120 is a cyclic load, the passage of the fluid between the connecting portion 108 and connecting portion 110 can provide additional damping capabilities and can minimize or eliminate dynamic coupling. The fluid can move between the connecting portion 108 and the connecting portion 110 as a result of the movement of the first end plate 122 and the second end plate 124 in the corresponding connection portion 108 and 110. For example, as the first end plate 122 moves away from the driven shaft 106, fluid can flow from the connecting portion 108 to the connecting portion 110 via passageway 128. Similarly, as the second end plate 124 moves away from the driving shaft 104, fluid can flow from the connecting portion 110 to the connecting portion 108 via passageway 128. The amount of damping from the fluid flow can be controlled by the size and number of passageways 128, e.g., holes and/or orifices, within the shaft 126 and at the end plates 122, 124.

In another embodiment, the connecting portion 110 can be connected to driving shaft 104 and connecting portion 108 can be connected to the driven shaft 106. Under normal loads (or external forces), there is no deflection of the driving shaft 104 because the second end plate 124 is against (or contacting) the connecting portion 110 and spring loaded to a preselected force by the second spring mechanism 114. If a tension load exceeds the preselected force, the shaft 126 and second end plate 124 can compress the second spring mechanism 114. If a compression load exceeds the preselected force, the connecting portion 108 can compress the first spring mechanism 112 against the first end plate 122. The coupling system 14 is damped, so that substantial oscillatory loads do not induce dynamic resonance. Damping can be provided by fluid flow through orifices in the shaft 126 first end plate 122 and second end plate 124, or alternately by spring washers laminated with elastomeric materials positioned between the first and second end plates 122, 124 and the first and second connecting portions 108, 110.

In another embodiment as shown in FIGS. 24 and 25, the coupling system 14 can include a coupler 140 coupling the driving shaft 104 and the driven shaft 106. The coupler 140 (i.e., the energy transfer device 15 of the coupling system 14) is used to transfer energy from the driving shaft 104, which can be connected to and moved by a motor 13 (not shown in FIGS. 24 and 25), to the driven shaft 106, which can be connected to the driven object 20 (not shown in FIGS. 24 and 25). The coupler 140 can include a hollow tube 145 that receives an end plate 142 of the driving shaft 104 at one end and an end plate 144 of the driven shaft 106 at the other end. The end plates 142, 144 can be separated by a barrier portion 146 located in substantially the center of the tube 145. In one embodiment, end plate 142 can be held in the tube 145 by an end portion 141 having an aperture to permit passage of the driving shaft 104 and end plate 144 can be held in the tube 145 by an end portion 143 having an aperture to permit passage of the driven shaft 106.

When the driving shaft 104 is extended or retracted along a center axis, the driven shaft 106 can likewise be extended and retracted along the same axis (or a parallel axis) by the force applied onto the driven shaft 106 by either the barrier portion 146 or the end portion 143. Similarly, when the driven shaft 106 is extended or retracted along a center axis, the driving shaft 104 can likewise be extended and retracted along the same axis (or a parallel axis) by the force applied onto the driving shaft 104 by either the barrier portion 146 or the end portion 141.

In one embodiment, the tube 145 can have a hollow cylindrical shape such that the first end plate 142 and the second end plate 144 are able to move axially (like a piston) in the tube 145. A load mitigation system 17 can be used with the coupler 140 to "pre-load" the coupler 140 and absorb external sources of energy applied to the coupler 140. The pre-load on the coupler 140 enables the coupler 140 to prevent deflection of the driving shaft 104 relative to the driven shaft 106 when external forces applied to the driven shaft 106 are less than the pre-load conditions.

As shown in the embodiment of FIGS. 24 and 25, the load mitigation system 17 can be oriented or positioned to be in-line or substantially co-axial with the driving shaft 104 and the driven shaft 106. The load mitigation system 17 has a first spring mechanism 112 positioned between the barrier portion 146 and the first end plate 142 and a second spring mechanism 114 positioned between the second end plate 144 and the end portion 143. The pre-load for the coupler 140 provided by the load mitigation system 17 can be based on the spring tension of the first spring mechanism 112 and the second spring mechanism 114. In another embodiment, the pre-load for the coupler 140 can be provided by one or more detent mechanism incorporated into the coupler 140. In one embodiment, the first and second spring mechanisms 112 and 114 can each be a disc spring (or Belleville washer), spring washer, coil spring or other suitable type of spring. In another embodiment, one or both of the first spring mechanism 112 and the second spring mechanism 114 can be laminated with an elastomeric material, which can alter the corresponding pre-load force provided by the first spring mechanism 112 and the second spring mechanism 114.

In an embodiment, the first end plate 142, the second plate 144 and the barrier portion 146 of the coupler 140 can have one or more passageways to permit a fluid to flow between the sides of the tube 145 defined by the barrier portion 146, which movement of fluid between the sides of the tube 145 can alter the corresponding pre-load force provided by the first spring mechanism 112 and the second spring mechanism 114. In one embodiment, the fluid can be a hydraulic fluid and the end portion 141 can be sealed along the driving shaft 104 and the end portion 143 can be sealed along the driven shaft 106. In another embodiment, the first end plate 142 and/or the second end plate 144 can include a Lee Visco-Jet disk.

The first spring mechanism 112 can be used to absorb external compression loads that exceed the spring pre-load, such as can be found in cyclic loads or impact loads, on the coupler 140, through the compression of the first spring mechanism 112. The second spring mechanism 114 can be used to absorb external tensile loads, such as can be found in cyclic loads or impact loads, on the coupler 140, through the compression of the second spring mechanism 114. If the external load on the coupler 140 is a cyclic load, the passage of a fluid through the barrier portion 146 can provide additional damping capabilities and can minimize or eliminate dynamic coupling. The fluid can flow though the barrier portion 146 as a result of the movement of the first end plate 142 and the second end plate 144 in the tube 145. The amount of damping from the fluid flow can be controlled by the size and number of passageways, e.g., holes and/or orifices, within the barrier portion 146 and at the end plates 142, 144.

Under normal loads (or external forces) on the driven shaft 106, there is no deflection of the driving shaft 104 because the second end plate 144 is against (or contacting) the barrier portion 146 and spring loaded to a preselected force by the second spring mechanism 114. If a tension load exceeds the preselected force, the second end plate 124 can compress the second spring mechanism 114 before deflecting the driving shaft 104. If a compression load exceeds the preselected force, the barrier portion 146 can compress the first spring mechanism 112 against the first end plate 142 before deflecting the driving shaft 104. The coupling system 14 is damped, so that substantial oscillatory loads do not induce dynamic resonance. Damping can be provided by fluid flow through orifices in the barrier portion 146, first end plate 142 and second end plate 144, or alternately by spring washers laminated with elastomeric materials in contact with the first and second end plates 142, 144.

Figure 13:
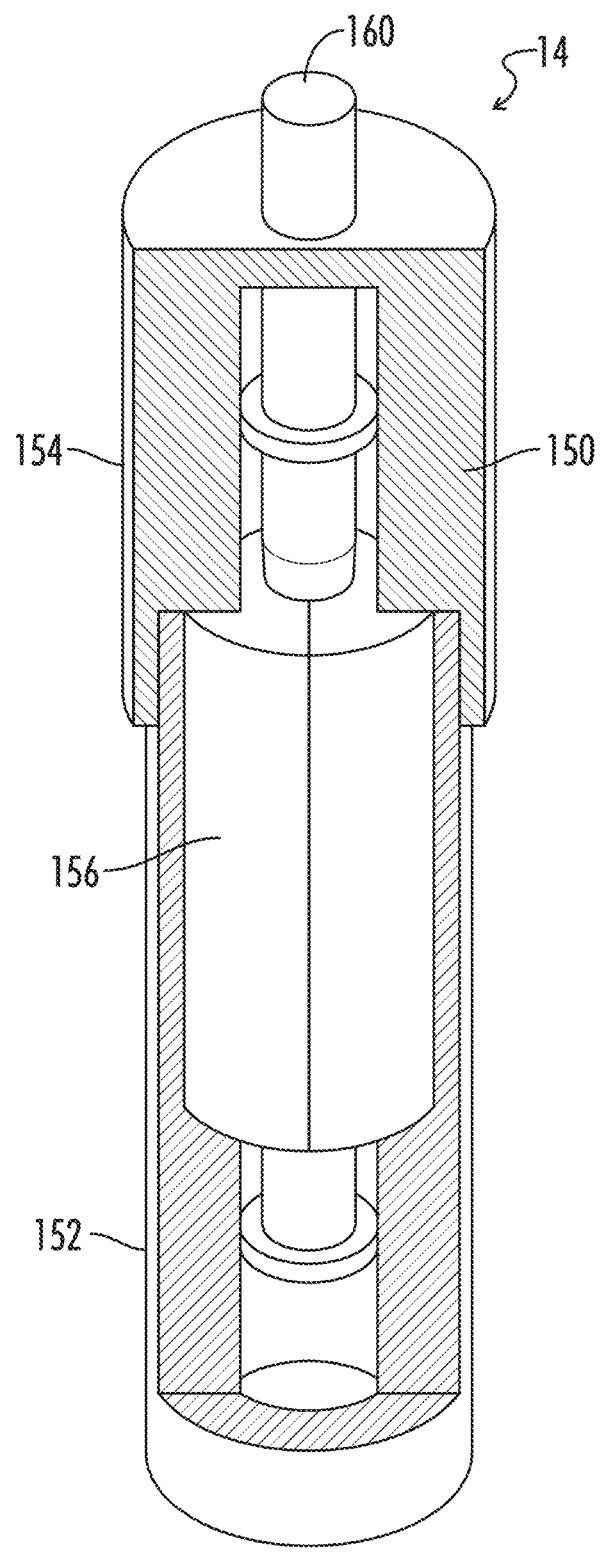
FIG. 13 shows a perspective view of a coupling system with an embodiment of a load mitigation system.
Figure 14:
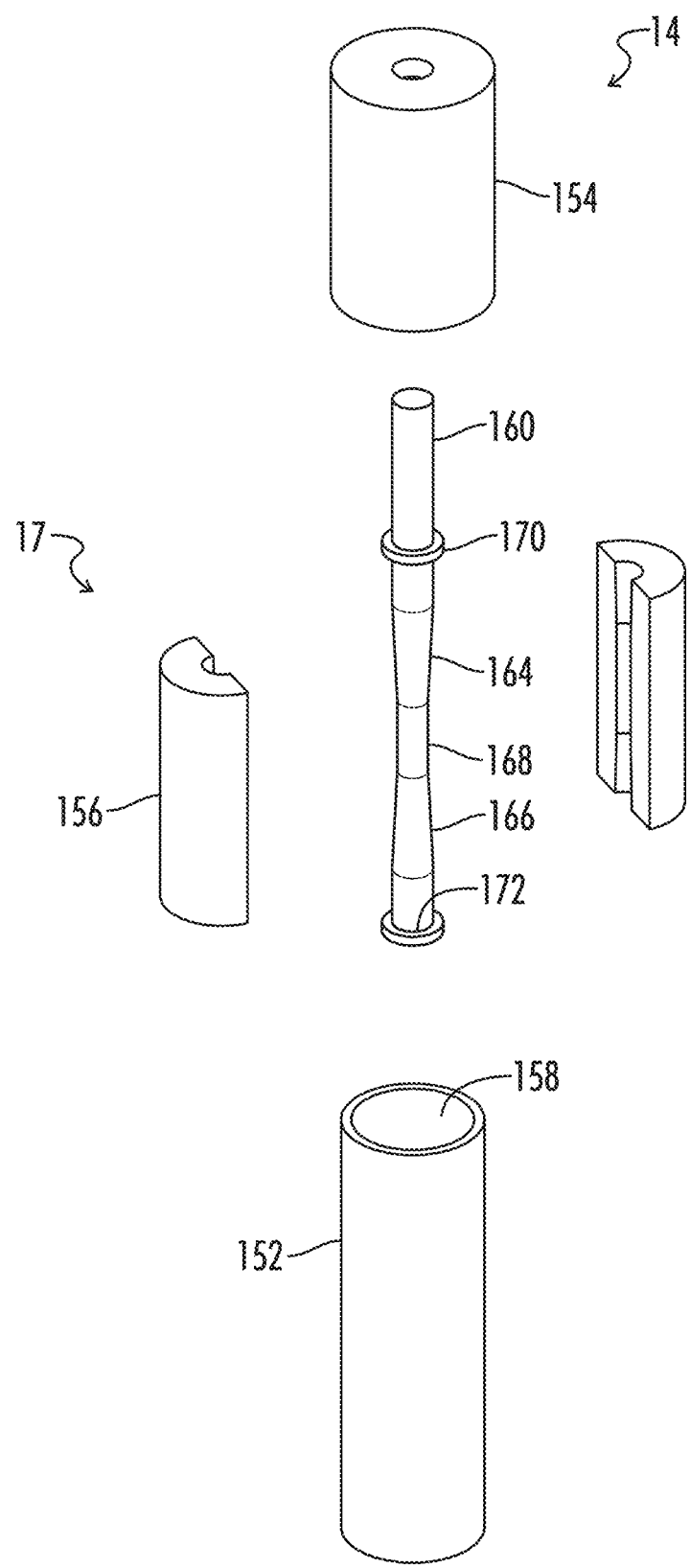
FIG. 14 shows an exploded view of the coupling system of FIG. 13.
Figure 15:
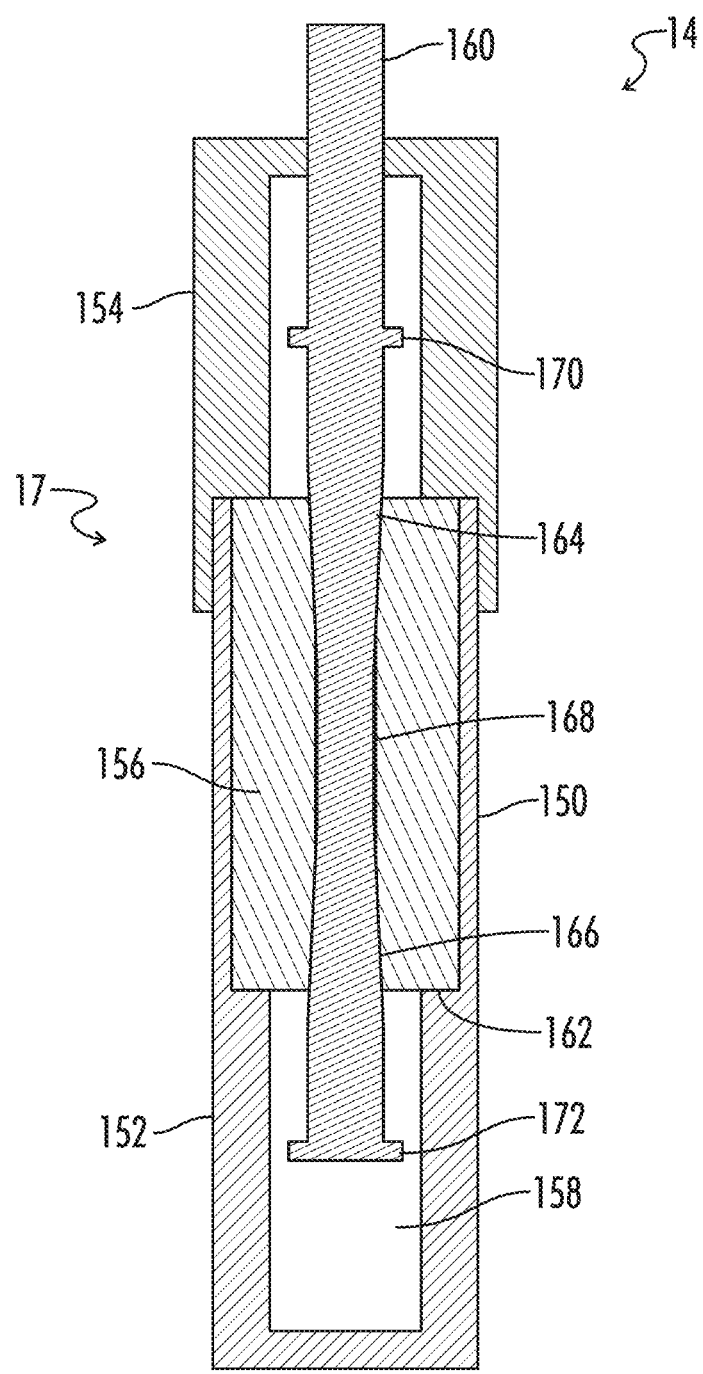
FIG. 15 shows a cross-sectional view of the coupling system of FIG. 13.

As shown in FIGS. 13-15, the coupling system 14 can include a coupler 150 coupling the driving shaft 104 (not shown in FIGS. 13-15) and the driven shaft 106 (not shown in FIGS. 13-15). The coupler 150 (i.e., the energy transfer device 15 of the coupling system 14) is used to transfer energy from the driving shaft 104, which can be connected to and moved by a motor 13 (not shown in FIGS. 13-15), to the driven shaft 106, which can be connected to the driven object 20 (not shown in FIGS. 13-15). The coupler 150 can have a first connecting portion 152 coupled to the driving shaft 104 and a second connecting portion 154 coupled to the driven shaft 106 such that when the driving shaft 104 is extended or retracted along a center axis, the driven shaft 106 can likewise be extended and retracted along the same axis by the force applied to the second connecting portion 154 (which is coupled to the driven shaft 106) by the first connecting portion 152 (which is coupled to the driving shaft 104).

The first connecting portion 152 can be connected to the second connecting portion 154 such that movements of the first connecting portion 152 result in corresponding movements of the second connecting portion 154. In one embodiment, the first connecting portion 152 can be connected to the second connecting portion 154 by a frictional connection. However, in other embodiments, the first connecting portion 152 can be connected to the second connecting portion 154 by adhesives, mechanical fasteners or other suitable connecting techniques or mechanisms. A load mitigation system 17 can be used with the coupler 150 to "pre-load" the coupler 150 and absorb external sources of energy applied to the coupler 150. The pre-load on the coupler 150 enables the coupler 150 to prevent deflection of the driving shaft 104 relative to the driven shaft 106 when external forces applied to the driven shaft 106 are less than the pre-load conditions. In another embodiment, the load mitigation system 17 can include one or more spring mechanisms coupled to one or both of the first connecting mechanism 152 and the second connecting mechanism 154 to absorb external forces, especially repeated cyclic forces.

The load mitigation system 17 can be oriented or positioned to be in-line or substantially co-axial with the driving shaft 104 and the driven shaft 106. The load mitigation system 17 has a damping mechanism 156 positioned in a cavity 158 of the first connecting portion 152 and a shaft 160 coupled to the driven shaft 106 and extending through the second connecting portion 154 and the damping mechanism 156 into the cavity 158 of the first connecting mechanism 152. In an embodiment, the damping mechanism 156 can be a viscoelastic material such as Sorbothane, an elastomeric material, a rubber material or a polymer material. In one embodiment, the first connecting portion 152 can include an internal ledge or shoulder 162 that extends into the cavity 158. The internal ledge 162 can be used to support or hold the damping mechanism 156 in the first connecting portion 152. In addition, the internal ledge 162 can be used to divide the cavity 158 into different portions having different internal diameters.

The shaft 160 can have a first tapered portion 164 and a second tapered portion 166 connected together by a connecting portion 168. The first tapered portion 164 and the second tapered portion 166 each have a first diameter that equals the diameter of the connecting portion 168. The diameter of the first tapered portion 164 and the second tapered portion 166 can increase as the first tapered portion 164 and the second tapered portion 166 extend away from the connecting portion 168. The amount of change in the diameter of the first tapered portion 164 and the second tapered portion 166 corresponds to the taper or angle associated with the first tapered portion 164 and the second tapered portion 166. In one embodiment, the first tapered portion 164 and the second tapered portion 166 can have the same taper or angle. However, in other embodiments, the first tapered portion 164 and the second tapered portion 166 can have different angles or tapers. The damping mechanism 156 can have a center hole that is configured to engage with the connecting portion 168 and at least a portion of the first tapered portion 164 and the second tapered portion 166 to form a frictional connection between the damping mechanism 156 and the shaft 160. In one embodiment, a portion of one or both of the first tapered portion 164 and the second tapered portion 166 can extend beyond the damping mechanism 156. In another embodiment, the first tapered portion 164 and the second tapered portion 166 can each be configured to have a plurality of increasing steps instead of a continuously increasing contour.

The pre-load for the coupler 150 provided by the load mitigation system 17 can be based on the strength of the frictional connection between the shaft 160 (including the first tapered portion 164 and the second tapered portion 166) and the damping mechanism 156. If the driven shaft 106 has an external load that is less than the pre-load provided by the damping mechanism 156 and shaft 160, the driving shaft 104 is not affected by the external load. In contrast, if the driven shaft 106 has an external load greater than the pre-load condition, then the shaft 160 can move relative to the damping mechanism 156 to dampen and absorb the external load until a corresponding stop portion 170 and 172 of the shaft 160 moves into contact with damping mechanism 156.

The first tapered portion 164 and the damping mechanism 156 can be used to absorb external compression loads, such as can be found in cyclic loads or impact loads, on the coupler 150, through the deformation of the damping mechanism 156 as the first tapered portion 164 is inserted into the damping mechanism 156 as a result of the compression load. As the increasing diameter of the first tapered portion 164 is inserted into the hole (which is sized for a smaller diameter portion of the first tapered portion 164), the wider diameter portion of the first tapered portion 164 deforms (or compresses) the material of the damping mechanism 156. The first tapered portion 164 can be inserted into the damping mechanism 156 based on the external compression load until the stop portion 170 comes into contact with the damping mechanism 156. In one embodiment, if the material used for the damping mechanism 156 has sufficient elasticity, the shaft 160 and the damping mechanism 156 can return to the same positions (and pre-load state) prior to the compression load being applied to the driven shaft 106.

The second tapered portion 166 and the damping mechanism 156 can be used to absorb external tensile loads, such as can be found in cyclic loads or impact loads, on the coupler 150, through the deformation of the damping mechanism 156 as the second tapered portion 166 is inserted into the damping mechanism 156 as a result of the tensile load. As the increasing diameter of the second tapered portion 166 is inserted into the hole (which is sized for a smaller diameter portion of the second tapered portion 166), the wider diameter portion of the second tapered portion 166 deforms (or compresses) the material of the damping mechanism 156. The second tapered portion 166 can be inserted into the damping mechanism 156 based on the external tensile load until the stop portion 172 comes into contact with the damping mechanism 156. In one embodiment, if the material used for the damping mechanism 156 has sufficient elasticity, the shaft 160 and the damping mechanism 156 can return to the their same positions (and pre-load state) prior to the tensile load being applied to the driven shaft 106. If the external load on the coupler 150 is a cyclic load, the deformation of the material of the damping mechanism 156 by the first tapered portion 164 and the second tapered portion 166 can provide additional damping capabilities and minimize or eliminate dynamic coupling.

FIGS. 13-15 show a coupler 150 that can remain rigid under normal loads (or external forces), absorb somewhat higher loads with one or more damped springs (if used), and absorb very high loads, exerted over substantial distances, by having the contoured shaft 160 penetrate into a surrounding damping mechanism 156. The shaft 160 can be rigidly held by the damping mechanism 156 for all normal loads, even loads above some preselected level that is of the order of the expected peak design load under normal conditions. However, for loads well above the preselected level, the shaft 160 can penetrate into the damping mechanism 156. The majority of the penetration into the damping mechanism 156 with the contoured shaft 160 involves elastic deformation. Thus, a linear actuator using a coupler 150 can continue to be used, albeit with a slightly different overall length, and the shaft 160 can eventually be re-positioned. For even higher loads, especially impulse loads, the shaft 160 can penetrate deeper into the damping mechanism 156, causing an inelastic deformation, but reducing the impulse load in accordance with the impulse-momentum theorem. In effect, the coupler 150 can spread the load over a greater distance, and thus time, to decrease the impulsively applied force that would have been imposed on the linear actuator without the coupler 150.

Figure 16:
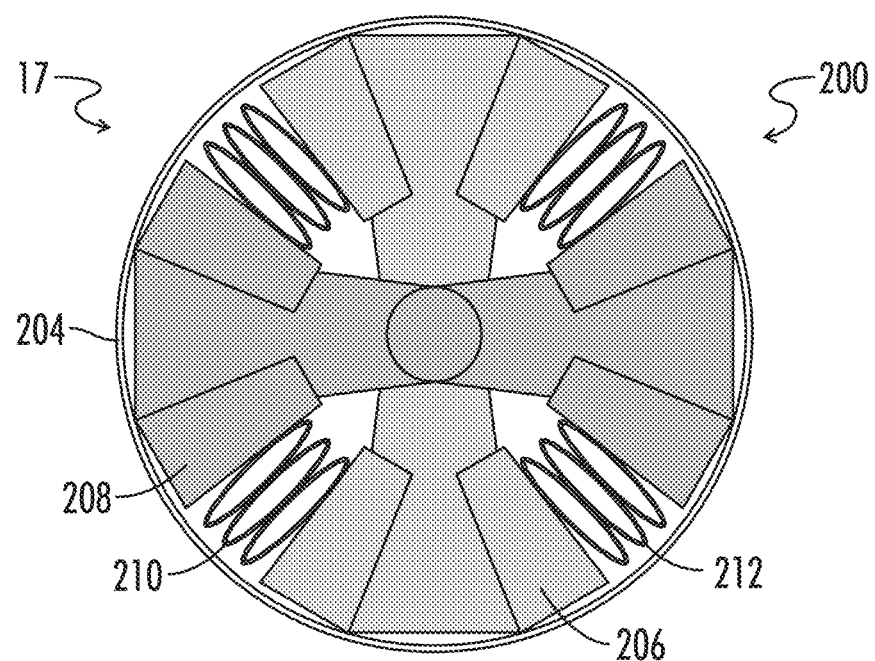
FIGS. 16-18 show schematic diagrams of coupling systems for rotational drives with embodiments of load mitigation systems.
Figure 17:
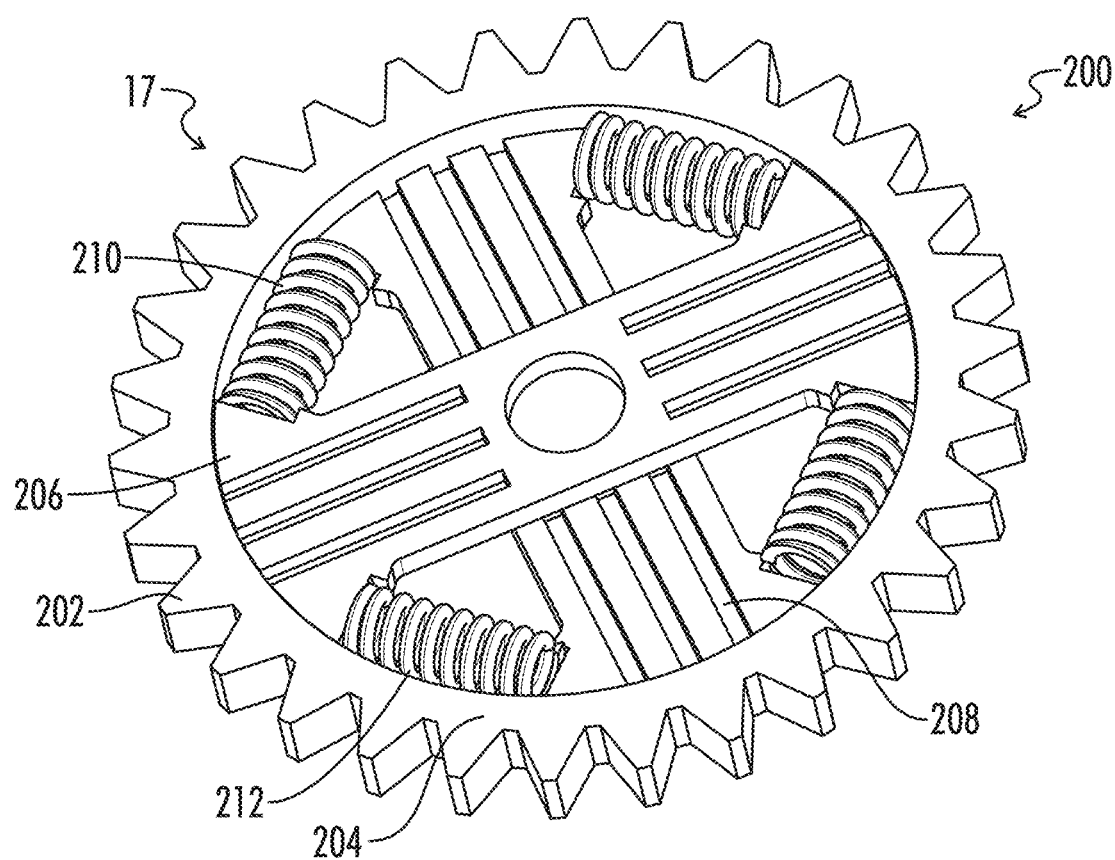

FIGS. 16-22 show different embodiments of load mitigation systems 17 incorporated into the coupling systems 14 of drive units 10 configured as rotational drive units. As shown in FIGS. 16 and 17, the load mitigation system 17 can be incorporated into a rotational drive mechanism 200. The rotational drive mechanism 200 (i.e., a portion of the energy transfer device 15 of the coupling system 14) can be coupled to the driving shaft 104 (not shown in FIGS. 16 and 17) and used to transfer energy from the driving shaft 104, which can be connected to and moved by a motor 13 (not shown in FIGS. 16 and 17), to a second rotational drive mechanism (not shown in FIGS. 16 and 17) that is coupled to the driven shaft 106 (not shown in FIGS. 16 and 17), which can be connected to the driven object 20 (not shown in FIGS. 16 and 17). In one embodiment, the rotational drive mechanism 200 can be a spur gear, planetary gear, sprocket, cogwheel or other similar type of toothed device. The rotational drive mechanism 200 can transfer energy to the second rotational drive mechanism via teeth 202 (see FIG. 17) of the rotational drive mechanism 200 engaging or meshing with teeth of the second rotational drive mechanism. In another embodiment, the second rotational drive mechanism can be configured similar to the first rotational drive mechanism 200 with a load mitigation system 17.

The teeth 202 of the rotational drive mechanism 200 can be mounted on or integral with a ring 204. In one embodiment, a first inner portion 206 can be connected to the driving shaft 104 and a second inner portion 208 can be connected to the ring 204. Each of the first inner portion 206 and the second inner portion 208 can be positioned along a diameter of the ring 204 and can be offset from one another by a predetermined angle. In one embodiment, the predetermined angle for the offset between the first inner portion 206 and the second inner portion 208 can be about 90 degrees. A load mitigation system 17 can be used with the rotational drive mechanism 200 to "pre-load" the rotational drive mechanism 200 and absorb external sources of energy applied to the rotational drive mechanism 200. The pre-load on the rotational drive mechanism 200 enables the rotational drive mechanism 200 to provide a stiff connection and to prevent deflection of the driving shaft 104 relative to the driven shaft 106 when external forces applied to the driven shaft 106 are less than the pre-load conditions. In another embodiment, the first inner portion 206 and the second inner portion 208 can be held by detent mechanisms that hold the first inner portion 206 and the second inner portion 208 together until a torque exceeding the pre-load of the corresponding detent mechanisms is exerted on one or both of the driving shaft 104 or the second rotational drive mechanism.

As shown in the embodiment of FIGS. 16 and 17, the load mitigation system 17 has a first spring mechanism 210 coupling a first end of the first inner portion 206 and a first end of the second inner portion 208 and a second spring mechanism 212 coupling the first end of the first inner portion 206 and a second end of the second inner portion 208 opposite the first end of the second inner portion 208. In one embodiment, the load mitigation system 17 can also include a first spring mechanism 210 and a second spring mechanism 212 coupling a second end of the first inner portion 206 opposite the first end and the second inner portion 208. In other embodiments, additional spring mechanisms may be placed between the first inner portion 206 and the second inner portion 208 depending on the configuration of the first inner portion 206 and the second inner portion 208.

The pre-load for the rotational drive mechanism 200 provided by the load mitigation system 17 can be based on the spring tension of the first spring mechanism(s) 210 and the second spring mechanism(s) 212 and/or based on any pre-load provided by the detent mechanisms, if used. In one embodiment, the first and second spring mechanisms 210 and 212 can each be a disc spring (or Belleville washer), spring washer, coil spring or other suitable type of spring. In another embodiment, the first spring mechanism 210 and/or the second spring mechanism 212 can be coated with an elastomeric material, e.g., Sorbothane, to provide additional damping for the rotational drive mechanism 200.

Upon release of the detent mechanisms, if used, the first spring mechanism 210 can be used to absorb external loads, such as can be found in cyclic loads or impact loads, attempting to rotate the rotational drive mechanism 200 in a counterclockwise direction, through the compression of the first spring mechanism 210 (and the expansion of the second spring mechanism 212). The second spring mechanism 212 can be used to absorb external loads, such as can be found in cyclic loads or impact loads, attempting to rotate the rotational drive mechanism 200 in a clockwise direction through the compression of the second spring mechanism 212 (and the expansion of the first spring mechanism 210). If the external load on the rotational drive mechanism 200 is an impact load, the compression of the first spring mechanism 210 or the second spring mechanism 212 can increase the time required for the applied external load to be transferred. If the external load on the rotational drive mechanism 200 is a cyclic load, the elastomeric material on the first spring mechanism 210 and the second spring mechanism 212 can provide additional damping capabilities and can minimize or eliminate load amplification from dynamic resonant coupling. In one embodiment, the second inner portion 208 can be integral with ring 204. In another embodiment, one or both of the first inner portion 206 and the second inner portion 208 can have slots that may have include an elastomeric material to provide additional damping. In a further embodiment, in the case of wind loads, the loads from gusts or vortex shedding can have both an essentially static load in one direction with a superimposed cyclic load (such as due to the shedding vortices). When the excessive load is no longer acting on the rotational drive mechanism 200, the first inner portion 206 and the second inner portion 208 can rotate back to their corresponding positions that engage the detent mechanisms.

Figure 18:
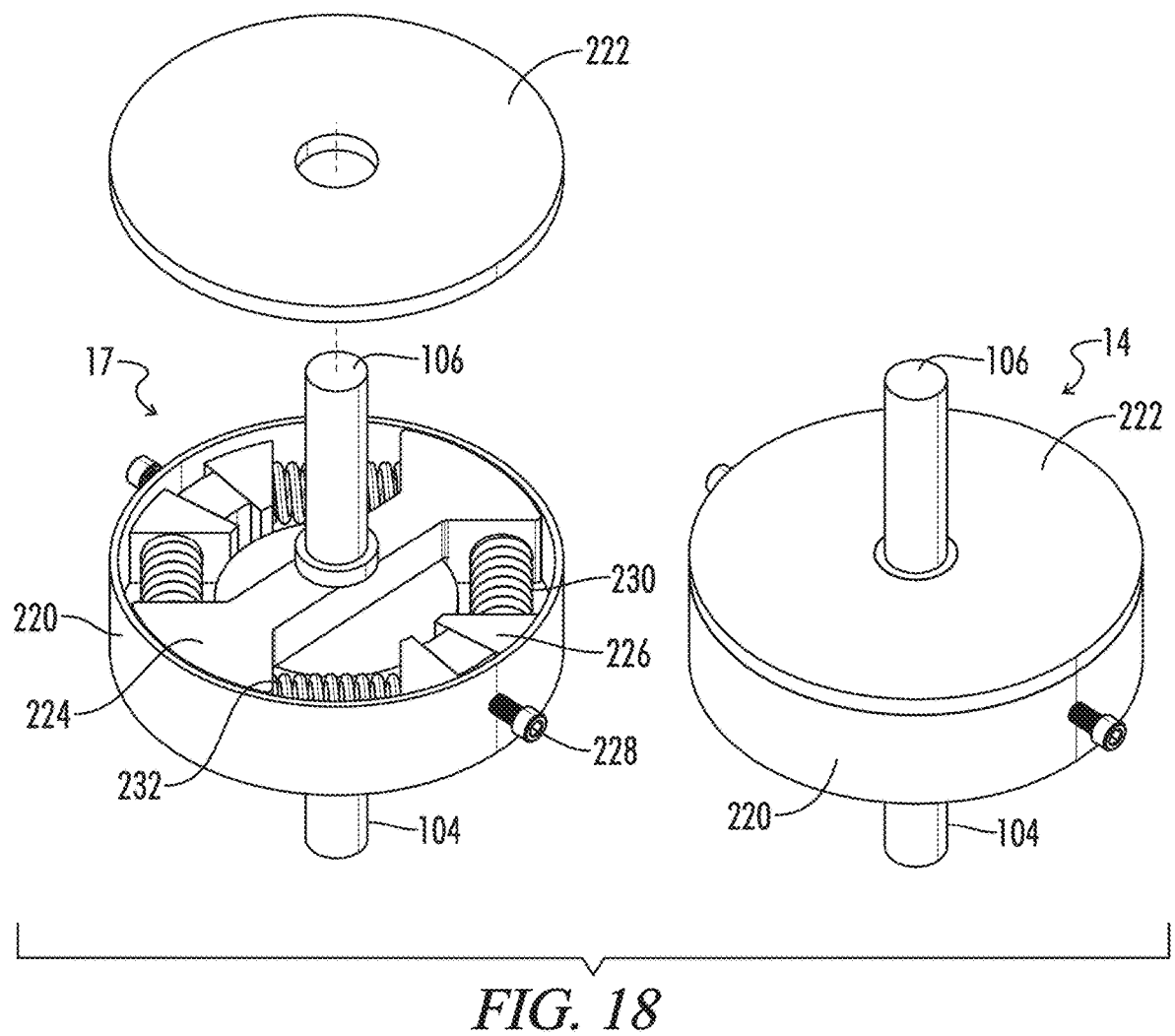

As shown in FIG. 18, the coupling system 14 can include a coupler 220 coupling the driving shaft 104 and the driven shaft 106. The coupler 220 (i.e., the energy transfer device 15 of the coupling system 14) is used to transfer energy from the driving shaft 104, which can be connected to and moved by a motor 13 (not shown in FIG. 18), to the driven shaft 106, which can be connected to the driven object 20 (not shown in FIG. 18). The coupler 220 can have a housing 222 connected to the driving shaft 104 and an inner member 224 positioned in the housing 222 and coupled to the driven shaft 106. The coupler 220 also includes one or more wedge portions 226 connected inside the housing 222 by temporarily adjusting (removable) fasteners 228, one or more first spring mechanism 230 coupling an end of the inner member 224 and the wedge portion 226 and one or more second spring mechanisms 232 coupling an opposed end of the inner member to an opposed side of the wedge portion 226. When the driving shaft 104 is rotated about its center axis, the driven shaft 106 can likewise be rotated about the same axis by the force applied to the inner member 224 by the wedge portion 226 and corresponding spring mechanism 230, 232 (depending on the direction of rotation).

A load mitigation system 17 can be used with the coupler 220 to "pre-load" the coupler 220 and absorb external sources of energy applied to the coupler 220. The pre-load on the coupler 220 enables the coupler 220 to prevent deflection of the driving shaft 104 relative to the driven shaft 106 when external forces applied to the driven shaft 106 are less than the pre-load conditions. The load mitigation system 17 can be used to absorb high loads, prevent load amplification due to dynamic resonant coupling, and provide a rigid, zero-backlash connection for loads below the pre-load condition. As shown in the embodiment of FIG. 18, the load mitigation system 17 can include the first spring mechanism 230 and the second spring mechanism 232. The pre-load for the coupler 220 provided by the load mitigation system 17 can be based on the spring tension of the first spring mechanism 230 and the second spring mechanism 232. In another embodiment, the pre-load for the coupler 220 can also include any pre-load provided by the use of detent mechanisms incorporated into the coupler 220. The spring tension of the first spring member 230 and the second spring member 232 can be adjusted by adjusting the dimensions of the wedge portion 226 (e.g., extending or retracting the sides of the wedge portion 226) with the fastener 228. In one embodiment, the first and second spring mechanisms 230 and 232 can each be a disc spring (or Belleville washer), spring washer, coil spring or other suitable type of spring. In another embodiment, the first spring mechanism 230 and/or the second spring mechanism 232 can be coated with an elastomeric material, e.g., Sorbothane, to provide additional damping for the coupler 220.

The first spring mechanism 230 can be used to absorb external loads, such as can be found in cyclic loads or impact loads, attempting to rotate the coupler 220 in a clockwise direction, through the compression of the first spring mechanism 230 against the wedge portion 226. The second spring mechanism 212 can be used to absorb external loads, such as can be found in cyclic loads or impact loads, attempting to rotate the coupler 220 in a counterclockwise direction through the compression of the second spring mechanism 232 against the wedge portion 226. If the external load on the coupler 220 is a cyclic load, the elastomeric material on the first spring mechanism 230 and the second spring mechanism 232 can provide additional damping capabilities and can minimize or eliminate dynamic coupling.

Figure 19:
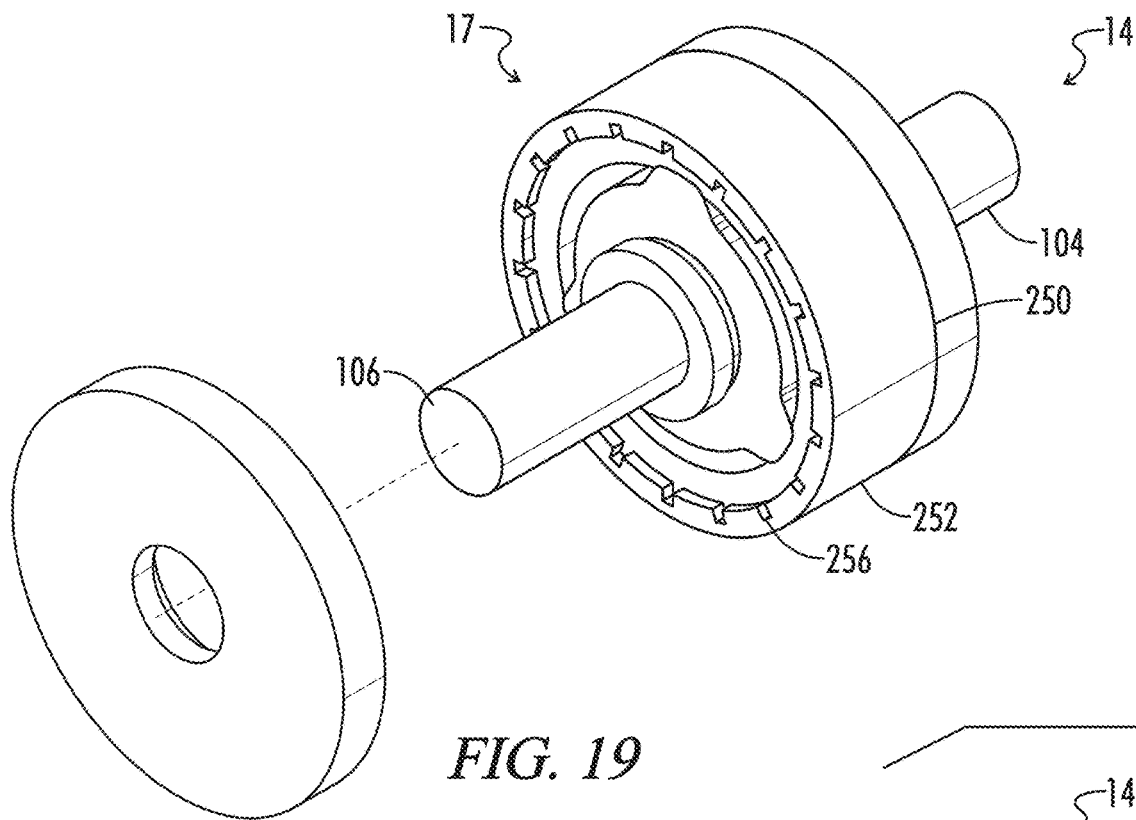
FIG. 19 shows a perspective view of a coupling system with an embodiment of a load mitigation system.
Figure 20:
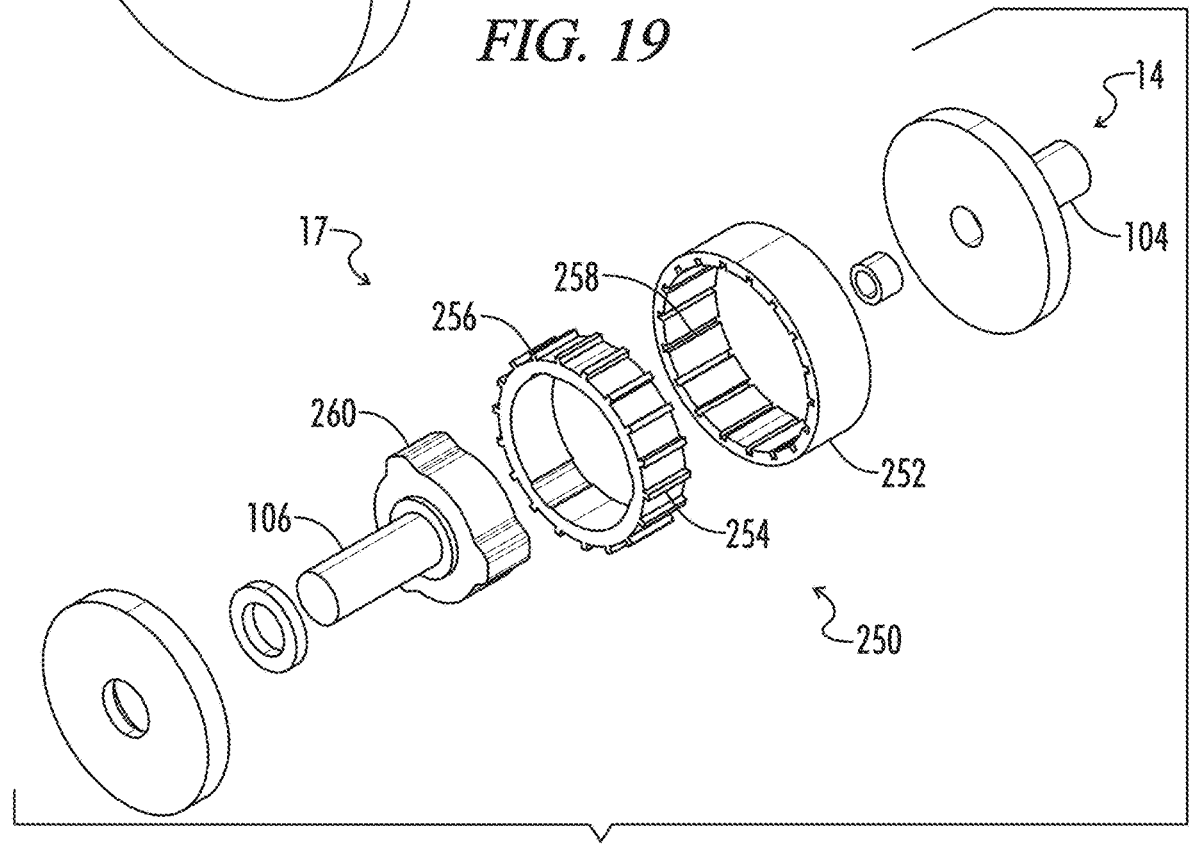
FIG. 20 shows an exploded view of the coupling system of FIG. 19.
Figure 21:
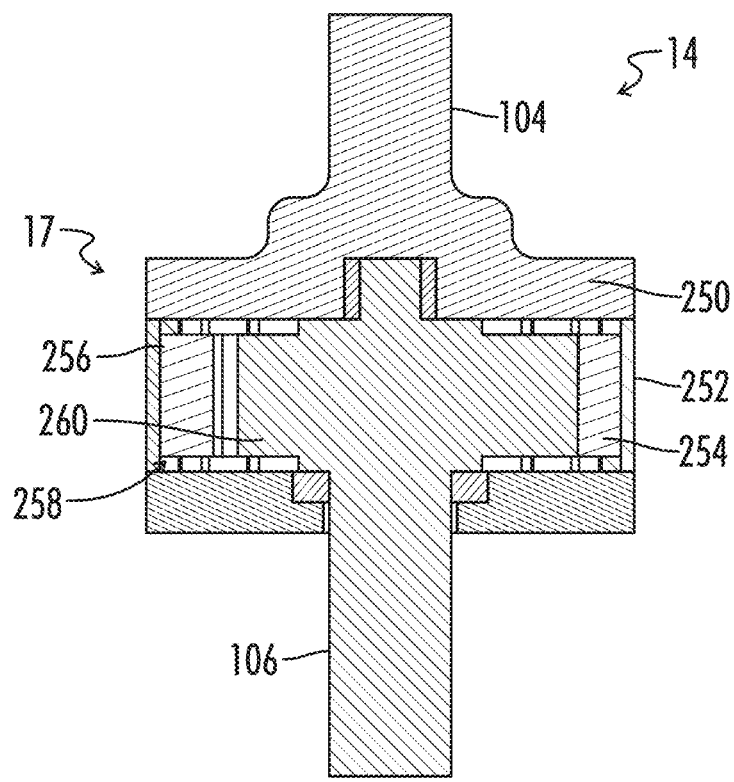
FIG. 21 shows a cross-sectional view of the coupling system of FIG. 19.

As shown in FIGS. 19-21, the coupling system 14 can include a coupler 250 coupling the driving shaft 104 and the driven shaft 106. The coupler 250 (i.e., the energy transfer device 15 of the coupling system 14) is used to transfer energy from the driving shaft 104, which can be connected to and moved by a motor 13 (not shown in FIGS. 19-21), to the driven shaft 106, which can be connected to the driven object 20 (not shown in FIGS. 19-21). The coupler 250 can have a housing 252 connected to the driving shaft 104 and an inner member 260 coupled to the driven shaft 106. The coupler 250 can also include a ring member 254 positioned in the housing 252 and coupled to the inner member 260. In one embodiment, the inner member 260 can be frictionally connected to the inner surface of the ring member 254, but other types of connections (e.g., detents) can be used in other embodiments. The ring member 254 can have one or more detents, projections or tabs 256 located on its outer surface. The detents 256 can be evenly (equal distances between detents) or unevenly (different distances between detents) distributed on the outer surface of the ring member 254. The detents 256 can be positioned in corresponding notches or grooves 258 in the housing 252. In one embodiment, the detents 256 of the ring member 254 can engage or mate with the notches 258 of the housing 252 to form a frictional connection between the detents 256 and notches 258 to hold the ring member 254 in position in the housing 252. When the driving shaft 104 is rotated about its center axis, the driven shaft 106 can likewise be rotated along the same axis by the force applied to the inner member 260 by the ring member 254 resulting from the rotation of the housing 252.

A load mitigation system 17 can be used with the coupler 250 to "pre-load" the coupler 250 and absorb external sources of energy applied to the coupler 250. The pre-load on the coupler 250 enables the coupler 250 to prevent deflection of the driving shaft 104 relative to the driven shaft 106 when external forces applied to the driven shaft 106 are less than the pre-load conditions. The pre-load for the coupler 250 provided by the load mitigation system 17 can be based on the elasticity and/or deformability of the detents 256 positioned in the notches 258. In another embodiment, the load mitigation system 17 can incorporate spring mechanisms similar to those described above with respect to FIGS. 16-18 to provide a pre-load based on the spring mechanisms of the load mitigation system 17.

The movement of the detents 256 relative to the notches 258 (i.e., the slipping of the detents 256) can be used to absorb external loads, such as can be found in cyclic loads or impact loads, attempting to rotate the coupler 250 in either a clockwise or counterclockwise direction. As the external load is applied to the driven shaft 106, the detents 256 would rotationally move within the housing 252 until the detents 256 can engage adjacent notches 258 in the housing 252. The movement of the detents 256 to adjacent notches 258 would occur within the housing 252 for as long as the external load applied to the driven shaft 106 was greater the pre-load condition between the detents 256 and the notches 258. In one embodiment, the number of notches 258 a particular detent 256 passes through from an external load can be determined and used to recalibrate the drive unit 10 once the external load condition has been removed.

In the embodiment of FIGS. 19-21, the ring member 254 cannot rotate within the housing 252 up to a certain load, i.e., the pre-load condition, thereby providing rigidity to the coupler 250. For external forces above the pre-load condition, the detents 256 can be forced to "give" and the ring member 254 can advance within the housing 252. The "give" angle to move the detent 256 to the next notch 258 is known, and thus corrections can be made in the command software for the device, similar to a re-initialization of a heliostat, to allow continued operation.

Figure 22:
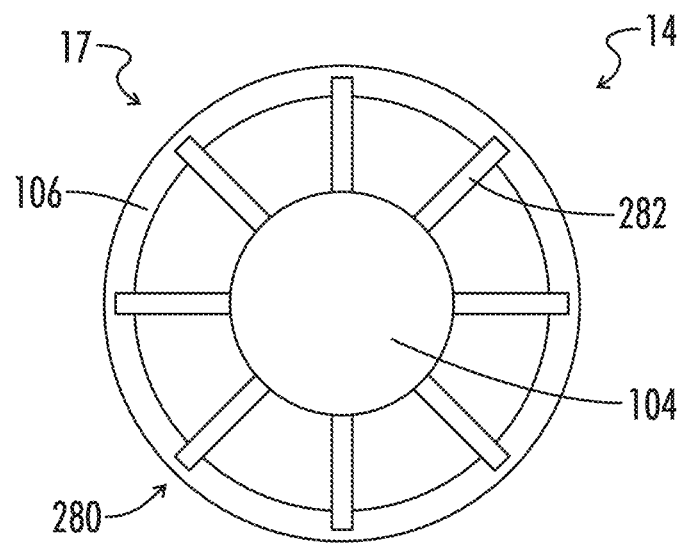
FIG. 22 shows a schematic diagram of a coupling system with an embodiment of a load mitigation system.

As shown in FIG. 22, the coupling system 14 can include a coupler 280 coupling the driving shaft 104 and the driven shaft 106. The coupler 280 (i.e., the energy transfer device 15 of the coupling system 14) is used to transfer energy from the driving shaft 104, which can be connected to and moved by a motor 13 (not shown in FIG. 22), to the driven shaft 106, which can be connected to the driven object 20 (not shown in FIG. 22). The coupler 280 can have two or more fins or splines 282 connected to the driving shaft 104 that engage in slots or grooves in the driven shaft 106. When the driving shaft 104 is rotated about its center axis, the driven shaft 106 can likewise be rotated about the same axis by the force applied to the driven shaft 106 by the splines 282.

A load mitigation system 17 can be used with the coupler 280 to "pre-load" the coupler 280 to avoid angular deflection of the splines 282 and absorb external sources of energy applied to the coupler 280. The pre-load on the coupler 280 enables the coupler 280 to prevent deflection of the driving shaft 104 relative to the driven shaft 106 when external forces applied to the driven shaft 106 are less than the pre-load conditions. In the embodiment of FIG. 22, the pre-load for the coupler 280 provided by the load mitigation system 17 can be provided by contouring the splines 282 such that as the driving shaft 104 and the driven shaft 106 are forced together to form the corresponding assembly, the splines or fins 282 are forced together, thereby developing the pre-load. For example, as the splines 282 are forced deeper into the respective slots of the driven shaft 106, the pre-load increases. In one embodiment, the splines 282 can be formed from metal, but the splines 282 may be formed from other suitable types of materials having a high degree of strength and stiffness in other embodiments. In another embodiment, the splines 282 can be coated with an elastomeric material, e.g., Sorbothane, to provide additional damping for the coupler 280.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A coupling system to transfer energy from a power supply to an object, the coupling system comprising:
    a first energy transfer device configured to be coupled to the power supply;
    a second energy transfer device configured to be coupled to the object; and
    a load mitigation system coupled to both the first energy transfer device and the second energy transfer device, the load mitigation system comprising:
        a pre-load system, the pre-load system configured to provide a force on the first energy transfer device and to prevent a transfer of external forces to the first energy transfer device due to a counter-acting external force on the object when the counter-acting external force on the object is less than the force on the first energy transfer device;
        a damping system, the damping system comprising at least one damper element and configured to mitigate the counter-acting external force to limit a load applied to the first energy transfer device when the counter-acting external force on the object is greater than the force on the first energy transfer device; and
        the pre-load system comprising a shaft coupled to the second energy transfer device and extending through the at least one damper element, wherein the force on the first energy transfer device is based on the frictional connection between the shaft and the at least one damper element.

2. The coupling system of claim 1, wherein the external force is at least one of an impulsive load or a cyclical load.

3. The coupling system of claim 1, wherein the first energy transfer device, the second energy transfer device and the load mitigation system are incorporated into a linear actuator.

4. The coupling system of claim 1, wherein the load mitigation system dampens both resonant loads and impact loads occurring at the object.

5. The coupling system of claim 1, wherein the at least one damper element comprises one of a viscoelastic material, an elastomeric material, a rubber material or a polymer material.

6. The coupling system of claim 1, wherein the shaft includes at least one taper portion in contact with the at least one damper element.

7. The coupling system of claim 6, wherein the at least one taper portion includes a first taper portion located adjacent to a first end of the at least one damper element and a second taper portion located adjacent to a second end of the at least one damper element opposite the first end of the at least one damper element.

8. A method for reducing fatigue and dynamic amplification of loads in an object, the method comprising:
    coupling a load mitigation system to a first energy transfer device and a second energy transfer device, the first energy transfer device configured to be coupled to a power supply, the second energy transfer device configured to be coupled to the object;
    pre-loading the load mitigation system to provide a force on the first energy transfer device with a pre-load system;
    preventing, with the pre-load system, a transfer of external forces to the first energy transfer device due to a counter-acting external force on the object when the counter-acting external force on the object is less than the force on the first energy transfer device;
    mitigating, with a damping system, the counter-acting external force to limit a load applied to the first energy transfer device when the counter-acting external force on the object is greater than the force on the first energy transfer device, the damping system comprising at least one damper element; and
    the pre-load system comprising a shaft coupled to the second energy transfer device and extending through the at least one damper element, wherein the force on the first energy transfer device is based on the frictional connection between the shaft and the at least one damper element.

9. The method of claim 8, wherein the mitigating the counter-acting external force includes dampening both resonant loads and impact loads occurring at the object.

10. The method of claim 8, wherein the at least one damper element comprises one of a viscoelastic material, an elastomeric material, a rubber material or a polymer material.

11. The method of claim 8, wherein the shaft includes at least one taper portion in contact with the at least one damper element.

12. The method of claim 11, wherein the at least one taper portion includes a first taper portion located adjacent to a first end of the at least one damper element and a second taper portion located adjacent to a second end of the at least one damper element opposite the first end of the at least one damper element.

13. A coupling system for a linear actuator comprising:
    an energy transfer system comprising:
        a first connecting portion configured to be coupled to a first shaft; and
        a second connecting portion configured to be coupled to a second shaft, the second connecting portion connected to the first connecting portion to permit energy to be transferred from the first connecting portion to the second connecting portion; and
    a load mitigation system positioned to be substantially co-axial with the first shaft and the second shaft, the load mitigation system comprising:
        a damper element positioned in a cavity in the first connecting portion;
        a third shaft configured to be coupled to the second shaft, the third shaft extending through the second connecting portion and the damper element into the cavity of the first connecting portion; and
        the load mitigation system configured to apply a pre-load condition to the energy transfer system and absorb external sources of energy applied to the energy transfer system, wherein the pre-load condition is based on a frictional connection between the third shaft and the damper element.

14. The coupling system of claim 13, wherein the damper element comprises one of a viscoelastic material, an elastomeric material, a rubber material or a polymer material.

15. The coupling system of claim 13, wherein the third shaft includes at least one taper portion in contact with the damper element.

16. The coupling system of claim 15, wherein the at least one taper portion includes a first taper portion located adjacent to a first end of the damper element and a second taper portion located adjacent to a second end of the damper element opposite the first end of the damper element.

17. The coupling system of claim 13, wherein the first connecting portion has a ledge to support the damper element in the cavity.

* * * * *